United States Patent
Hoshino et al.

(10) Patent No.: US 8,374,276 B2
(45) Date of Patent: Feb. 12, 2013

(54) RADIO COMMUNICATION APPARATUS AND RESENDING CONTROLLING METHOD

(75) Inventors: Masayuki Hoshino, Kanagawa (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 863 days.

(21) Appl. No.: 12/518,787

(22) PCT Filed: Dec. 7, 2007

(86) PCT No.: PCT/JP2007/073698
§ 371 (c)(1),
(2), (4) Date: Jun. 11, 2009

(87) PCT Pub. No.: WO2008/081683
PCT Pub. Date: Jul. 10, 2008

(65) Prior Publication Data
US 2010/0020893 A1   Jan. 28, 2010

(30) Foreign Application Priority Data
Dec. 28, 2006   (JP) .............................. P2006-354569

(51) Int. Cl.
*H04B 7/02* (2006.01)
*H04L 1/02* (2006.01)
(52) U.S. Cl. .................. 375/267; 375/259; 375/260
(58) Field of Classification Search .................. 375/267
See application file for complete search history.

(56) References Cited

U.S. PATENT DOCUMENTS
8,040,982 B1 * 10/2011 Nabar et al. ................. 375/344

2005/0014464 A1 * 1/2005 Larsson ...................... 455/11.1
(Continued)

FOREIGN PATENT DOCUMENTS
JP   2004-040232 A   2/2004
JP   2004-072427 A   3/2004
(Continued)

OTHER PUBLICATIONS

LG Electronics, Samsung, NTT-DoCoMo, "CDD-based Precoding for E-UTRA downlink MIMO", GPP TSG RAN WG1 meeting #47, Nov. 6-10, 2006.

(Continued)

*Primary Examiner* — Erin File
(74) *Attorney, Agent, or Firm* — Pearne & Gordon LLP

(57) ABSTRACT

A synthesized gain in a resending operation can be improved significantly by relatively simple control when resending control is applied upon executing of a transmission diversity using CDD. A radio communication apparatus equipped with a plurality of antennas and for performing communication by MIMO, includes a phase shift amount assigning section 18 for executing a CDD process to assign a cyclic phase shift to a transmission signal on a frequency axis, a response signal demodulator 16 for demodulating ACK/NACK received from a destination station, and outputting control information about a resending operation when NACK is received and a reception is failed, and an initial phase controller 17 for setting an offset to a phase shift at a time of CDD process in response to a number of transmission times in resending control such that a predetermined offset, which is produced by adding a phase difference from a signal transmitted from other antenna to the phase shift, is assigned to a signal transmitted from the antenna over a full frequency band, wherein a frequency characteristic of a radio propagation path at a time of resending is changed every time of transmission times.

17 Claims, 15 Drawing Sheets

U.S. PATENT DOCUMENTS

| | | | |
|---|---|---|---|
| 2005/0020215 A1 | 1/2005 | Hottinen | |
| 2005/0117520 A1 | 6/2005 | Miyoshi | |
| 2005/0152314 A1* | 7/2005 | Sun et al. | 370/334 |
| 2005/0255805 A1 | 11/2005 | Hottinen | |
| 2007/0189263 A1* | 8/2007 | Izumi et al. | 370/350 |
| 2010/0061482 A1* | 3/2010 | Lee et al. | 375/296 |
| 2010/0316094 A1* | 12/2010 | Tung | 375/150 |
| 2011/0188559 A1* | 8/2011 | Van Nee | 375/226 |

FOREIGN PATENT DOCUMENTS

| | | |
|---|---|---|
| WO | 03/015334 A1 | 2/2003 |
| WO | 03/101029 A1 | 12/2003 |
| WO | 2004/025874 A1 | 3/2004 |

OTHER PUBLICATIONS

3rd Generation Partnership Project et al; 3GPP TR 25.814 v7.1.0, Physical layer aspects for evolved Universal Terrestrial Radio Access (UTRA) (Release 7) Sep. 2006.

Motorola et al; "EUTRA Downlink MIMO Requirements and Design" 3GPP TSG RAN WGI #42, London, U.K., Aug. 29-Sep. 2, 2005.

Samsung et al; "Further Details on Adaptive Cyclic Delay Diversity Scheme" 3GPP TSG RAN WG1 #42bis, San Diego, CA, USA Oct. 10-14, 2005.

International Search Report for PCT/JP2007/073698.

* cited by examiner

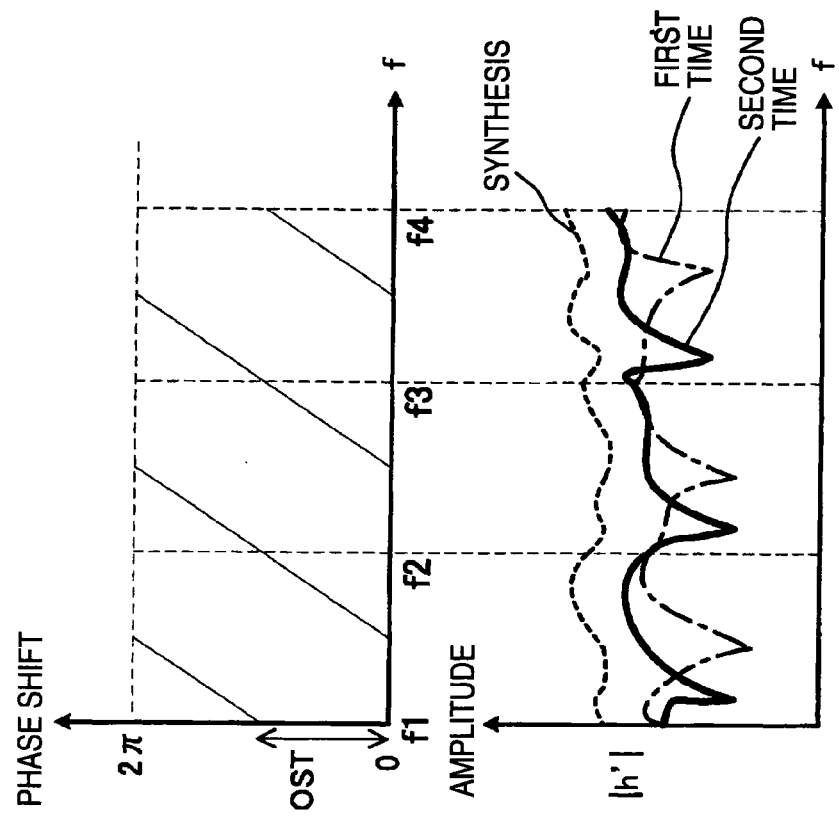
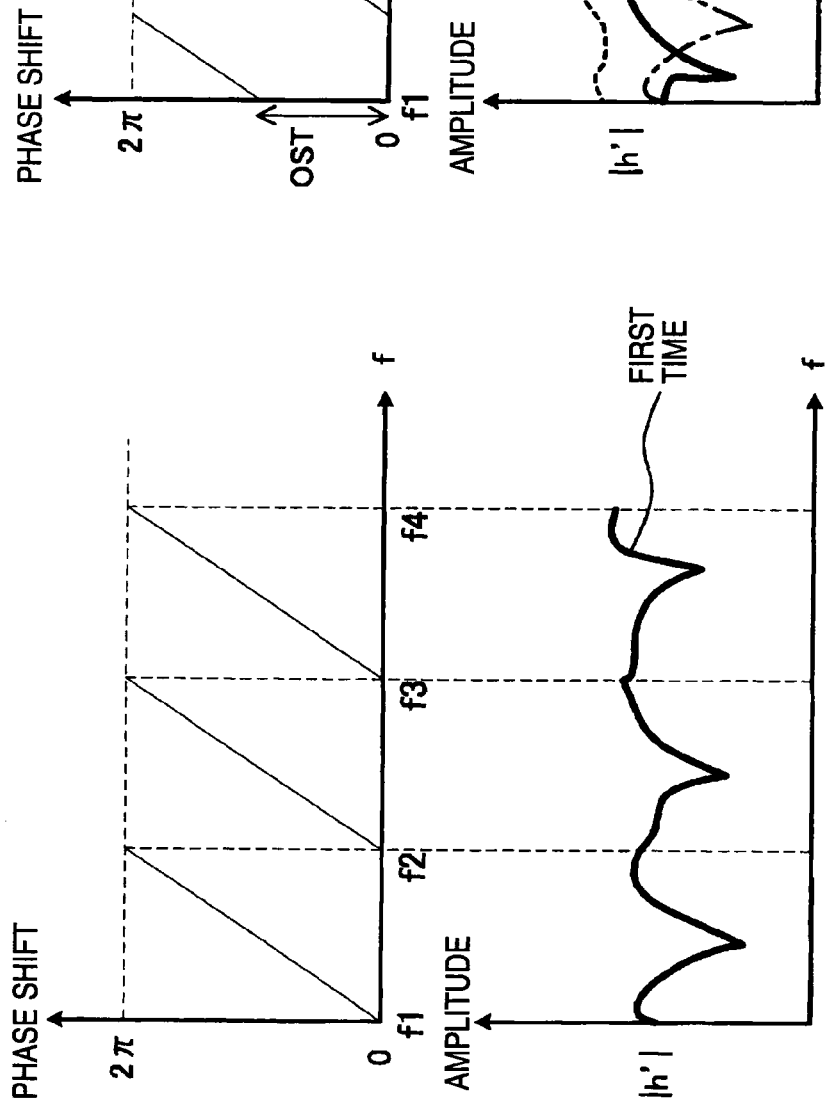

| NUMBER OF TRANSMISSION TIMES | 1 | 2 | 3 | 4 |
|---|---|---|---|---|
| VALUE OF INITIAL PHASE [rad] | 0 | $\pi$ | $\frac{1}{2}\pi$ | $\frac{3}{2}\pi$ |

| NUMBER OF TRANSMISSION TIMES | 1 | 2 | 3 | 4 | 5 |
|---|---|---|---|---|---|
| VALUE OF INITIAL PHASE [rad] | 0 | $\frac{4}{5}\pi$ | $\frac{8}{5}\pi$ | $\frac{2}{5}\pi$ | $\frac{6}{5}\pi$ |

FIG. 11

| NUMBER OF TRANSMISSION TIMES | 1 | 2 | 3 | 4 |
|---|---|---|---|---|
| VALUE OF INITIAL PHASE [rad] | 0 | $\pi$ | $\frac{1}{2}\pi$ | $\frac{3}{2}\pi$ |
| SIGNAL A OUTPUT ANTENNA | FIRST | SECOND | FIRST | SECOND |
| SIGNAL B OUTPUT ANTENNA | SECOND | FIRST | SECOND | FIRST |

FIG. 15A

| NUMBER OF TRANSMISSION TIMES | 1 | 2 | 3 | 4 | 5 |
|---|---|---|---|---|---|
| SHIFT AMOUNT [SAMPLE] | 100 | 110 | 90 | 120 | 80 |

FIG. 15B

| NUMBER OF TRANSMISSION TIMES | 1 | 2 | 3 | 4 | 5 |
|---|---|---|---|---|---|
| SHIFT AMOUNT [SAMPLE] | 64 | 95 | 33 | 79 | 49 |

RADIO COMMUNICATION APPARATUS AND RESENDING CONTROLLING METHOD

TECHNICAL FIELD

The present invention relates to a radio communication apparatus and a resending controlling method, which are applicable to a radio communication system employing MIMO (Multi Input Multi Output).

BACKGROUND ART

In the most up-to-date radio communication system used in a cellular system for mobile communication such as a cellular phone, or the like, for example, a plurality of antennas are provided to each radio communication station by employing MIMO, and also a study of introduction of CDD (Cyclic Delay Diversity) that is one type of DD (Delay Diversity) as a transmission diversity is advancing.

In the delay diversity, a transmitting station transmits the same signals from a plurality of antennas and such signals are controlled such that a sufficient time difference (delay) in signal is produced among a plurality of antennas respectively. Accordingly, even when an interval between a plurality of antennas is small, a sufficient difference (time difference) is produced in the radio signals that arrive at the receiving station from a plurality of antennas of the transmitting station respectively. Therefore, the receiving station can recognize differences in propagation paths (paths) of a radio wave respectively, and can extract a target signal by separating respective signals every path. As a result, a diversity effect can be achieved.

Also, a delay time is changed cyclically in CDD. For example, as disclosed in Non-Patent Literature 1, when communication is held by using OFDM (Orthogonal Frequency Division Multiplexing) in which a large number of subcarriers whose frequencies are different mutually are superposed, a mutually different cyclic delay is assigned to respective frequencies of the subcarriers such that an amount of delay (or phase) is changed every frequency of the subcarrier.

Accordingly, a frequency selectivity appears, as shown in FIG. 17A, for example, in the propagation characteristic of the radio propagation path that extends from the transmitting station to the receiving station. FIGS. 17A and 17B are graphs showing concrete examples of a frequency characteristic in the radio propagation path and a frequency characteristic of a phase shift respectively. FIG. 17A shows an amplitude on the propagation path in the first-time transmission, and FIG. 17B shows an amplitude on the propagation path in the second-time transmission by the resending operation. In an example shown in FIG. 17A, such a case is assumed that a phase difference (phase rotating angle) $\phi_k$ given by Formula 1 is assigned to the signal of each subcarrier signal as a phase shift, where N denotes an FFT (Fourier Transform) size (the number of subcarriers), D denotes a phase shift amount, and k denotes the subcarrier number.

[Formula 1]

$$\phi_k = e^{j2\pi \frac{D}{N} k} \qquad (1)$$

That is, the frequency characteristic in which a section where a receiving level (amplitude) is large (good receiving condition section) and a section where a receiving level is small (falloff in level: notch) appear periodically at an interval of N/D on the frequency axis is obtained. Therefore, the frequency selectivity on the radio propagation path can be enhanced by employing CDD, and thus a frequency diversity effect can be achieved. The section where the receiving level (amplitude) is large, mentioned herein, corresponds to the section that is derived by summing up the good receiving condition sections out of instantaneous variations of the signals that arrive from the transmission antennas respectively. Thus, SINR (Signal-to-Interference plus Noise power Ratio (Interference Signal Suppression Degree)) for a desired radio wave can be enhanced.

In contrast, when the propagation state in the radio propagation paths between the transmitting station and the receiving station became worse, in some cases the signal transmitted from a target transmitting station (desired wave) cannot be correctly received at the receiving station. In such case, the resending control is applied in many cases. More particularly, the receiving station informs the transmitting station of NACK (Not Acknowledgement) when it could not correctly receive a packet, or the like of a desired wave, and then the transmitting station transmits repeatedly the same data (packet, or the like) as the precedingly transmitted data (the data whose transmission is failed) when it detects NACK from the receiving station.

Even when the propagation state in the radio propagation paths became worse, a chance that the receiving station can receive correctly the target signal is increased by applying the resending control. In particular, when hybrid ARQ (Automatic Request for Repetition) is employed, a decoding of the received signal is tried while utilizing the information of signals that were received in the past. As a result, a probability that the receiving station succeeds in a reception at a time of resending operation is increased.

However, in the circumstances that the propagation state in the radio propagation paths does not so change with the lapse of time within a predetermined frequency width, a chance that the receiving station succeeds in a reception of the packet is not increased even when the resending control is applied. Therefore, consequently the same packet should be transmitted repeatedly in many times, and throughput (an amount of data transmitted per unit time) is lowered. In this manner, due to the event that an amplitude in the propagation path is not changed within a frequency width (in a relative bandwidth) whose variation on the propagation path can be regarded constant, in some cases a synthesized gain obtained by the resending operation becomes small and thus an effect of resending control cannot so much obtained.

Also, an effect of a frequency diversity can be achieved by employing CDD. However, when the propagation state in the radio propagation paths was seldom changed in the resending operation from that in the transmission at the first time, an effect of the resending control cannot so much obtained in the above-mentioned situation. In this event, as shown in FIG. 17(b), a change of the frequency selectivity is not so much produced by CDD between the first-time transmission and the second-time transmission (the resending operation) even when the resending control is applied, and thus a fading falloff due to the frequency selectivity occurs in the same position on the frequency axis. As a result, such a problem existed that a synthesized gain obtained when the resending signals are composed by the resending control is not so much improved by employing CDD, and thus a probability of successful reception at a time of resending operation cannot be so much enhanced.

Non-Patent Literature 1: 3GPP TSG RAN WG1 #42, R1-050715, Motorola, "EUTRA Downlink MIMO Requirements and Design", 2005

DISCLOSURE OF INVENTION

Problem that Invention is to Solve

As described above, there exit such problems that, when resending control is applied while executing the transmission diversity by employing CDD, the fading falloff due to the frequency selectivity produced by employing CDD occurs in the same position on the frequency axis, and thus the synthesized gain produced when the resending signals are composed by the resending control cannot be so much increased.

The present invention has been made in view of the above circumstances, and it is an object of the present invention to provide a radio communication apparatus and a resending controlling method, capable of improving significantly a synthesized gain in a resending operation by relatively simple control when resending control is applied at a time of execution of a transmission diversity using CDD.

Means for Solving the Problems

A radio communication apparatus according to the present invention is a radio communication apparatus for performing communication by MIMO (Multi Input Multi Output) using a plurality of antennas, the radio communication apparatus including: a cyclic delay diversity processor which is adapted to apply a cyclic delay diversity process to a signal transmitted from at least one antenna such that a phase is changed cyclically on a frequency axis; a resending controller which is adapted to execute a resending operation; and a transmission phase offset controller which is adapted to give a certain offset against a signal over all frequency bands transmitted from a concerned antenna for causing a phase difference over another signal transmitted from another antenna in addition to a phase shift assigned in the cyclic delay diversity process, such that the offset is set in response to a number of transmission times in the resending control operation.

Accordingly, when resending control is applied in executing the transmission diversity using CDD, the frequency characteristic of the radio propagation path can be changed every number of transmission times by giving an offset to the phase shift being set in response to the number of transmission times, and thus the notch in the frequency characteristic at a time of transmission can be displaced. Therefore, a signal having the independent propagation path characteristic can be added in the resending synthesizing operation on the receiving side. As a result, a synthesized gain in the resending operation can be improved significantly by relatively simple control, and a frequency diversity effect due to CDD can be achieved sufficiently.

Also, in the radio communication apparatus of the present invention, the transmission phase offset controller is adapted to set the offset that is changed every number of transmission times in the resending control operation such that a phase difference of the offset has as large a value as possible in a predetermined condition from a phase difference in a preceding transmission.

Also, in the radio communication apparatus of the present invention, the transmission phase offset controller is adapted to set a value as the offset such that the phase difference of the offset comes as close to $\pi$ as possible in a predetermined condition from the phase difference in the preceding transmission.

Accordingly, when the resending control is applied at a time of execution of the transmission diversity using CDD, a phase difference produced by the offset every number of transmission times can be increased by setting a phase difference in the offset from the preceding transmission to as large a value as possible, e.g., a value that is close to the maximum phase difference $\pi$. As a result, an effect of improving a synthesized gain by the resending operation can be enhanced much more.

Also, the radio communication apparatus of the present invention further includes an antenna mapping controller which is adapted to set an antenna mapping containing a correspondence between the plurality of antennas and transmission signals, in response to the number of transmission times in the resending control operation.

Accordingly, when the resending control is applied at a time of execution of the transmission diversity using CDD, the antenna used in the resending operation can be changed every number of transmission times by setting an antenna mapping in response to the number of transmission times. Thus, the different quality of the radio propagation path can be obtained on average in response to the number of transmission times respectively. Therefore, the independence of the propagation path characteristic every transmission can be enhanced much more in the resending synthesis on the receiving side, and a synthesized gain produced by the resending operation can be increased. As a result, the larger synthesized gain can be obtained.

Also, in the radio communication apparatus of the present invention, the antenna mapping controller switches the antenna for the transmission signal every number of transmission times in the resending control operation.

Accordingly, when the resending control is applied at a time of execution of the transmission diversity using CDD, the different quality of the radio propagation path can be obtained in response to the number of transmission times by switching the antenna used for the transmission signal every number of transmission times. Therefore, a synthesized gain produced by the resending operation can be increased in the resending synthesis on the receiving side.

The radio communication apparatus of the present invention further includes a phase shift amount controller which is adapted to set a phase shift amount to a frequency change given in the cyclic delay diversity process, in response to the number of transmission times in the resending control operation.

Accordingly, when the resending control is applied at a time of execution of the transmission diversity using CDD, the frequency characteristic of the radio propagation path can be changed by setting a phase shift amount in response to the number of transmission times, e.g., by changing a phase shift amount every number of transmission times. Thus, position and interval of the notch in the frequency characteristic in each transmitting operation can be changed. Therefore, the independence of the propagation path characteristic every transmission can be enhanced much more in the resending synthesis on the receiving side, and a synthesized gain produced by the resending operation can be increased. As a result, the larger synthesized gain can be obtained.

A radio communication apparatus according to the present invention is a radio communication apparatus for performing communication by MIMO (Multi Input Multi Output) using a plurality of antennas, the radio communication apparatus including: a demodulator which is adapted to apply a demodulating process as a received signal with respect to the signal in which a signal transmitted from at least one antenna is underwent a cyclic delay diversity process such that a phase is changed cyclically on a frequency axis and in which a certain offset is given against a signal over all frequency bands transmitted from a concerned antenna for causing a phase difference over another signal transmitted from another antenna in addition to a phase shift assigned in the cyclic delay diversity process, such that the offset is set in response to a number of transmission times in the resending control operation; wherein the demodulator is adapted to apply the demodulating process to the received signal and a resending synthesizing process based on offset information that is in response to the number of transmission times.

Accordingly, when resending control is applied in executing the transmission diversity using CDD, a synthesized gain in the resending operation can be improved significantly by relatively simple control, in executing the resending synthesizing operation on the receiving side.

Also, in the radio communication apparatus of the present invention, when a signal in which an antenna mapping containing a correspondence between the plurality of antennas and transmission signals is set in response to the number of transmission times in the resending control operation is demodulated as the received signal, the demodulator applies the demodulating process and the resending synthesizing process based on antenna mapping information that is in response to the number of transmission times.

Also, in the radio communication apparatus of the present invention, when a signal in which a phase shift amount to a frequency change given in the cyclic delay diversity process is set in response to the number of transmission times in the resending control operation is demodulated as the received signal, the demodulator applies the demodulating process and the resending synthesizing process based on phase shift information that is in response to the number of transmission times.

Also, a radio communication base station apparatus of the present invention is equipped with the radio communication apparatus set forth in the above.

Also, a radio communication mobile station apparatus of the present invention is equipped with the radio communication apparatus set forth in the above.

A resending controlling method according to the present invention is a resending controlling method employed in a radio communication apparatus that performs communication by MIMO (Multi Input Multi Output) using a plurality of antennas, the resending controlling method including: a cyclic delay diversity processing step of applying a cyclic delay diversity process to a signal transmitted from at least one antenna such that a phase is changed cyclically on a frequency axis; a resending controlling step of executing a resending operation; and a transmission phase offset controlling step of giving a certain offset against a signal over all frequency bands transmitted from a concerned antenna for causing a phase difference over another signal transmitted from another antenna in addition to a phase shift assigned in the cyclic delay diversity process in response to a number of transmission times in the resending control operation.

Accordingly, when the resending control is applied in executing the transmission diversity using CDD, a synthesized gain in the resending operation can be improved significantly by the relatively simple control.

Also, the present invention is a radio communication system for performing communication by MIMO (Multi Input Multi Output) using a plurality of antennas, the radio communication system including: a transmitting device which includes: a cyclic delay diversity processor which is adapted to apply a cyclic delay diversity process to a signal transmitted from at least one antenna such that a phase is changed cyclically on a frequency axis; a resending controller which is adapted to execute a resending operation; and a transmission phase offset controller which is adapted to give a certain offset against a signal over all frequency bands transmitted from a concerned antenna for causing a phase difference over another signal transmitted from another antenna in addition to a phase shift assigned in the cyclic delay diversity process, such that the offset is set in response to a number of transmission times in the resending control operation; and a receiving device which includes: a demodulator which is adapted to apply a demodulating process to a received signal which is underwent a cyclic delay diversity process and which is given an offset in response to a number of transmission times in the resending control operation, so as to execute the demodulating process to the received signal and a resending synthesizing process based on offset information that is in response to the number of transmission times.

Advantages of the Invention

According to the present invention, the radio communication apparatus and the resending controlling method, capable of improving significantly a synthesized gain in the resending operation by the relatively simple control when the resending control is applied at a time of execution of the transmission diversity using CDD can be provided.

BRIEF DESCRIPTION OF THE DRAWINGS

FIGS. 3A and 3B are graphs showing a concrete example of a frequency characteristic on a radio propagation path and a frequency characteristic of a phase shift between the transmitting station and the receiving station according to the first embodiment respectively.

FIG. 11 is a schematic view showing concrete examples of contents of an antenna mapping table used in the transmitting station in the second embodiment.

FIGS. 15A and 15B are schematic diagrams showing concrete examples of contents of a phase shift amount table used in the transmitting station in the third embodiment.

Figure 1:
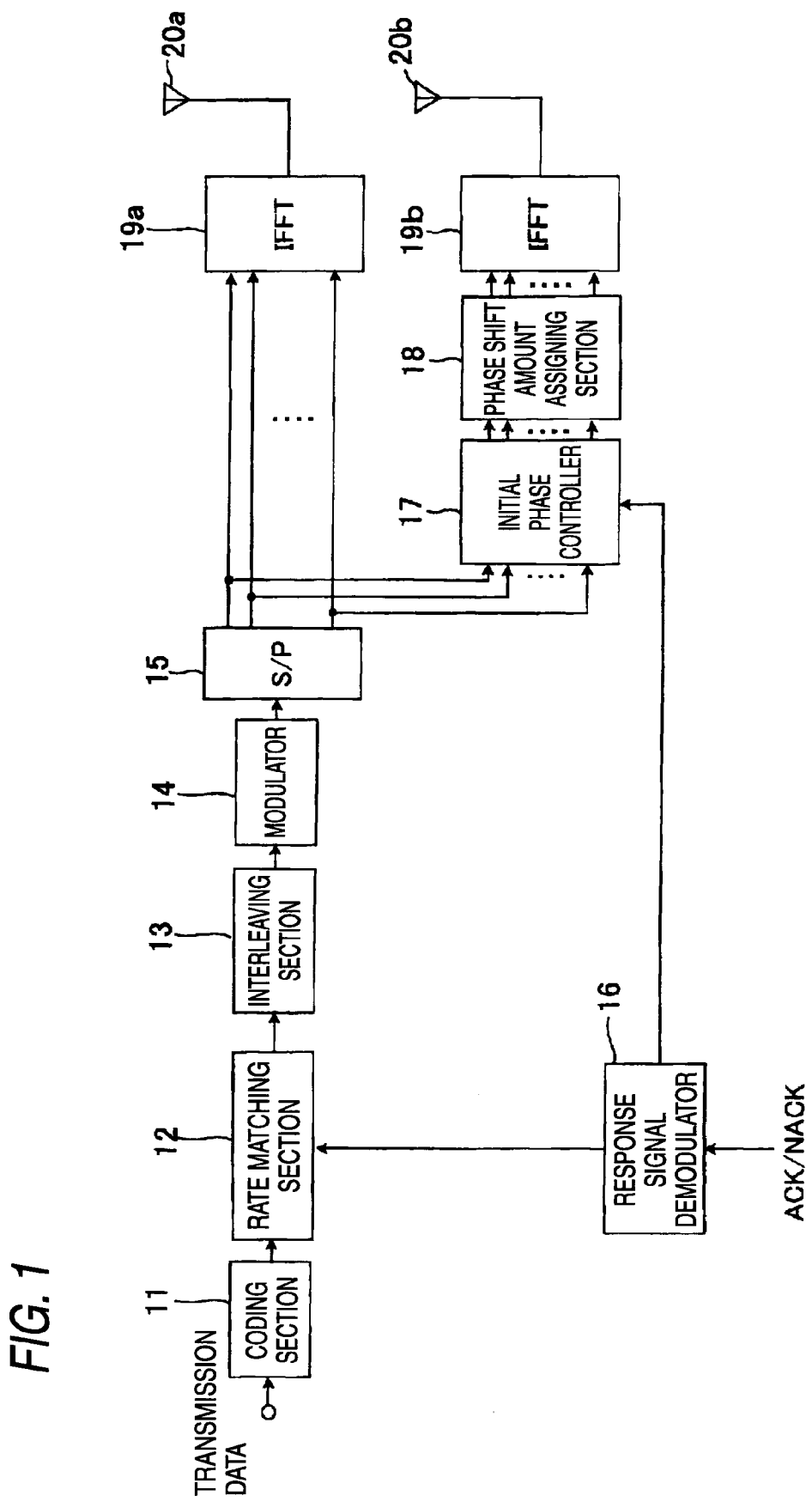
FIG. 1 is a block diagram showing a configuration of principal sections of a transmitting station employed in a first embodiment of the present invention.

DESCRIPTION OF REFERENCE NUMERALS AND SIGNS 11 coding section
12 rate matching section
13 interleaving section
14 modulator
15 serial/parallel converter (S/P)
16 response signal demodulator
17 initial phase controller
18, 23 phase shift amount assigning section
19a, 19b Inverse Fast Fourier Transformer (IFFT)
20a, 20b antenna
21 antenna mapping section
31a, 31b antenna
32a, 32b Fast Fourier Transformer (FFT)
33a, 33b parallel/serial converter (P/S)
34 control signal demodulator
35 demodulator
36, 56, 58 channel estimator
37 initial phase information saving section
38 deinterleaving section
39 rate dematching section
40 likelihood saving section
41 likelihood synthesizing section
42 decoding section
43 CRC checker
44 response signal outputting section
57 initial phase/antenna mapping information saving section
59 initial phase/shift amount information saving section

BEST MODE FOR CARRYING OUT THE INVENTION

As an example of a radio communication apparatus and a resending controlling method according to embodiments of the present invention, a configurative example of a radio communication system employing MIMO in a situation that a communication is held based on a multi-carrier communication system using OFDM and also resending control is applied while executing a transmission diversity based on CDD is shown. Here, following embodiments show merely examples for the purpose of illustration, and the present invention is not restricted to these embodiments.

First Embodiment

Figure 2:
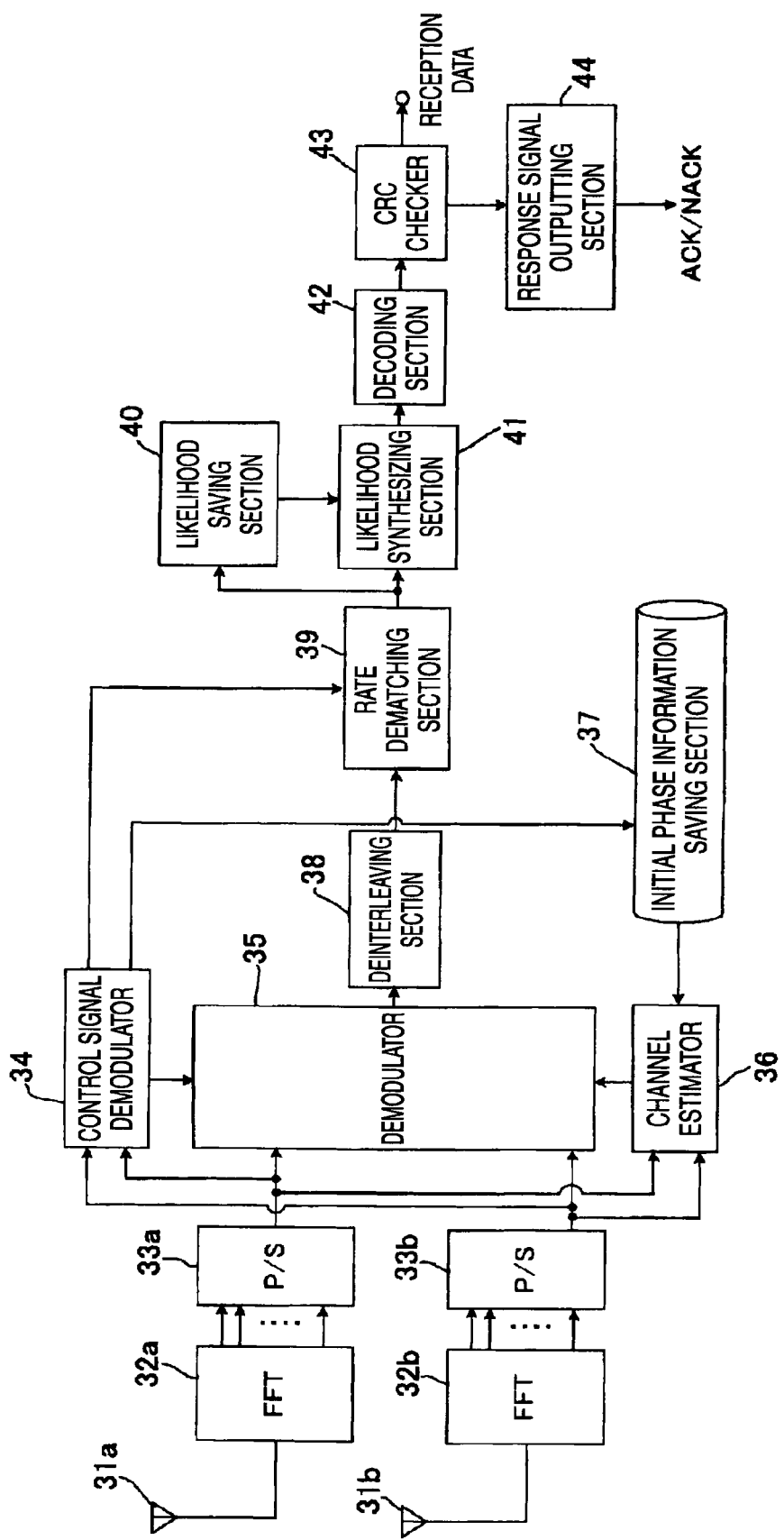
FIG. 2 is a block diagram showing a configuration of principal sections of a receiving station employed in the first embodiment of the present invention.

FIG. 1 is a block diagram showing a configuration of principal sections of a transmitting station employed in a first embodiment of the present invention. FIG. 2 is a block diagram showing a configuration of principal sections of a receiving station employed in the first embodiment of the present invention.

In the present embodiment, such a case is assumed that radio communication is held between the transmitting station shown in FIG. 1 and the receiving station shown in FIG. 2 by a radio wave. For example, such a situation is assumed that the transmitting station (transmitting equipment) shown in FIG. 1 is applied as a radio communication base station equipment (radio base station) of the cellular system, which provides a communication service of a mobile communication such as a cellular phone, or the like, and also the receiving station (receiving equipment) shown in FIG. 2 is applied as a user equipment (UE) serving as a radio communication mobile station equipment such as a cellular phone equipment, or the like. Also, it is assumed herein that the MIMO (Multiple Input Multiple Output antenna) system that carries out radio transmission/reception by using a plurality of antennas on both the transmitting side and the receiving side should be constructed.

The transmitting station shown in FIG. 1 is equipped with a coding section 11, a rate matching section 12, an interleaving section 13, a modulator 14, a serial/parallel converter (S/P) 15, a response signal (ACK/NACK) demodulator 16, an initial phase controller 17, a phase shift amount assigning section 18, a plurality of inverse Fourier transformers (IFFTs) 19a, 19b, and a plurality of antennas 20a, 20b.

The coding section 11 applies a coding process to the transmission data as an input transmission object. The rate matching section 12 changes adaptively multiple levels in modulation and a coding rate with regard to the data being output from the coding section 11. Thus, the rate matching section 12 implements an information transmission rate that is suited to a situation of the radio propagation path between the transmitting station and the receiving station. The interleaving section 13 applies a predetermined interleaving process to the data being output from the rate matching section 12 to improve a capacity of an error correcting coding. That is, the interleaving section 13 executes rearrangement of codes such that successive burst errors whose error correction is difficult are broken up and converted into correctable errors. The modulator 14 modulates the data being output from the interleaving section 13.

The serial/parallel converter 15 converts serial data being input from the modulator 14 into parallel data for use in OFDM (Orthogonal Frequency Division Multiplexing) communication, and then outputs the parallel data. That is, signals corresponding to a plurality of subcarriers that are superposed as OFDM signals respectively are output as the parallel data from the serial/parallel converter 15.

The parallel data being output from the serial/parallel converter 15 are branched into two systems. The parallel data in one system are used to produce a signal transmitted from the antenna 20a, while the parallel data in the other system are used to produce a signal transmitted from the antenna 20b.

The inverse Fourier transformer 19a applies an inverse Fourier transform to the parallel data being output from the serial/parallel converter 15. Thus, the inverse Fourier transformer 19a converts the signals from a frequency domain to a time domain to convert the signals adjacent to each other on the frequency axis into the orthogonal signals. Also, the inverse Fourier transformer 19a superposes the subcarriers on respective signals of the parallel data on the time axis, and also inserts a guard interval (GI) between the signals (symbols) adjacent to each other on the time axis to produce the OFDM signals.

The OFDM signals being output from the inverse Fourier transformer 19a are converted into high frequency signals in a predetermined radio frequency band by a high-frequency signal processing circuit (not shown), and then are amplified in power. Then, the resultant OFDM signals are transmitted as a radio wave from the antenna 20a.

Like the inverse Fourier transformer 19a, the inverse Fourier transformer 19b also applies the inverse Fourier transform to the parallel data being output from the serial/parallel converter 15. Here, the initial phase controller 17 and the phase shift amount assigning section 18 are provided between the serial/parallel converter 15 and the inverse Fourier transformer 19b. The initial phase controller 17 fulfills a function of the cyclic delay diversity processor, and the phase shift amount assigning section 18 fulfills a function of the transmitted phase offset controller. Also, the response signal demodulator 16 fulfills a function of the resending controller.

FIGS. 3A and 3B are graphs showing a concrete example of a frequency characteristic on a radio propagation path and a frequency characteristic of a phase shift between the transmitting station and the receiving station according to the first embodiment respectively. FIG. 3A shows an amplitude on the propagation path in the first-time transmission, and FIG. 3B shows an amplitude on the propagation path in the second-time transmission by the resending operation.

In the present embodiment, when the resending control is applied while executing the transmission diversity based on the CDD in the MIMO system, the initial phase controller 17 and the phase shift amount assigning section 18 apply a cyclic phase shift to at least one signal and also controls an initial phase shift amount (offset as an initial phase) in response to the number of resending times.

The phase shift amount assigning section 18 gives a cyclic phase shift to the signal being input into the inverse Fourier transformer 19b in the frequency domain. For example, in an example shown in FIG. 3A, the control is applied such that the phase is changed linearly and cyclically within an angle range of 0 to $2\pi$ [rad] in a range of frequencies f1 to f2, a range of frequencies f2 to f3, and a range of frequencies f3 to f4 respectively at a time of first-time transmission in FIG. 3A. Actually, a discrete and cyclic phase shift that is changed every frequency of the corresponding subcarrier is assigned to respective signals being input into the inverse Fourier transformer 19b.

The initial phase controller 17 decides an initial phase serving as the criterion of the phase shift that the phase shift amount assigning section 18 gives every resending operation. This initial phase is given as a predetermined amount of offset that is assigned to all subcarriers of the concerned antenna. The initial phase can be set individually to each antenna. The initial phase that the initial phase controller 17 decided appears as a different offset, which is changed every time of the resending operation, in the phase shift that the phase shift amount assigning section 18 assigns. Thus, a predetermined phase difference corresponding to the offset together with the phase shift appears in contrast to other antenna signals. For example, in an example shown in FIG. 3, the case where the initial phase is set to an angle $\pi$ [rad] at a time of second-time transmission in FIG. 3B is assumed. Therefore, respective phase shifts are deviated wholly from those in the first-time transmission in FIG. 3A by an angle $\pi$ [rad] corresponding to the offset OST in positions of respective frequencies.

Therefore, the parallel data being output from the serial/parallel converter 15 undergoes the phase shift every corresponding frequency, as shown in FIGS. 3A and 3B, and then are input into the inverse Fourier transformer 19b. The OFDM signals being produced by the inverse Fourier transformer 19b are converted into high frequency signals in a predetermined radio frequency band by a high-frequency signal processing circuit (not shown), and then are amplified in power. Then, the resultant OFDM signals are transmitted as a radio wave from the antenna 20b.

Here, a phase rotating angle $\phi_k$ corresponding to the signal whose subcarrier number is k is given by Formula 2.

[Formula 2]

$$\phi_k = e^{j(2\pi \frac{D}{N} k + \alpha)}; \alpha = 0, \pi, \frac{1}{2}\pi, \frac{3}{2}\pi \qquad (2)$$

N denotes an FFT (Fourier Transform) size (the number of subcarriers), D denotes a parameter of a phase shift amount, and $\alpha$ denotes an offset that changes in response to the number of transmission times.

That is, the initial phase controller 17 sets an offset $\alpha$, and the phase shift amount assigning section 18 gives a phase shift of overall $\phi_k$.

Therefore, the signal that is transmitted from the antenna 20b is delayed on the time axis from the signal that is transmitted from the antenna 20a, and this delay time is changed cyclically every frequency of the subcarrier. Namely, the cyclic delay diversity (CDD) is applied on the transmitting side.

The response signal demodulator 16 demodulates the response signal that is transmitted from the destination station that receives the signal transmitted from the concerned transmitting station (e.g., the receiving station shown in FIG. 2) and received at a receiving section (not shown), and executes the process about the resending control in answer to the response signal. That is, when the response signal demodulator 16 starts the resending operation based on ACK (Acknowledgement) and NACK (Not Acknowledgement) as the response signal, the response signal demodulator 16 informs the rate matching section 12 and the initial phase controller 17 of the number of transmission times (the number of resending times+1) about the data to be sent out next. The initial phase controller 17 decides the initial phase of the data to be sent out next, based on the number of transmission times input from the response signal demodulator 16.

Figures 4, 5:
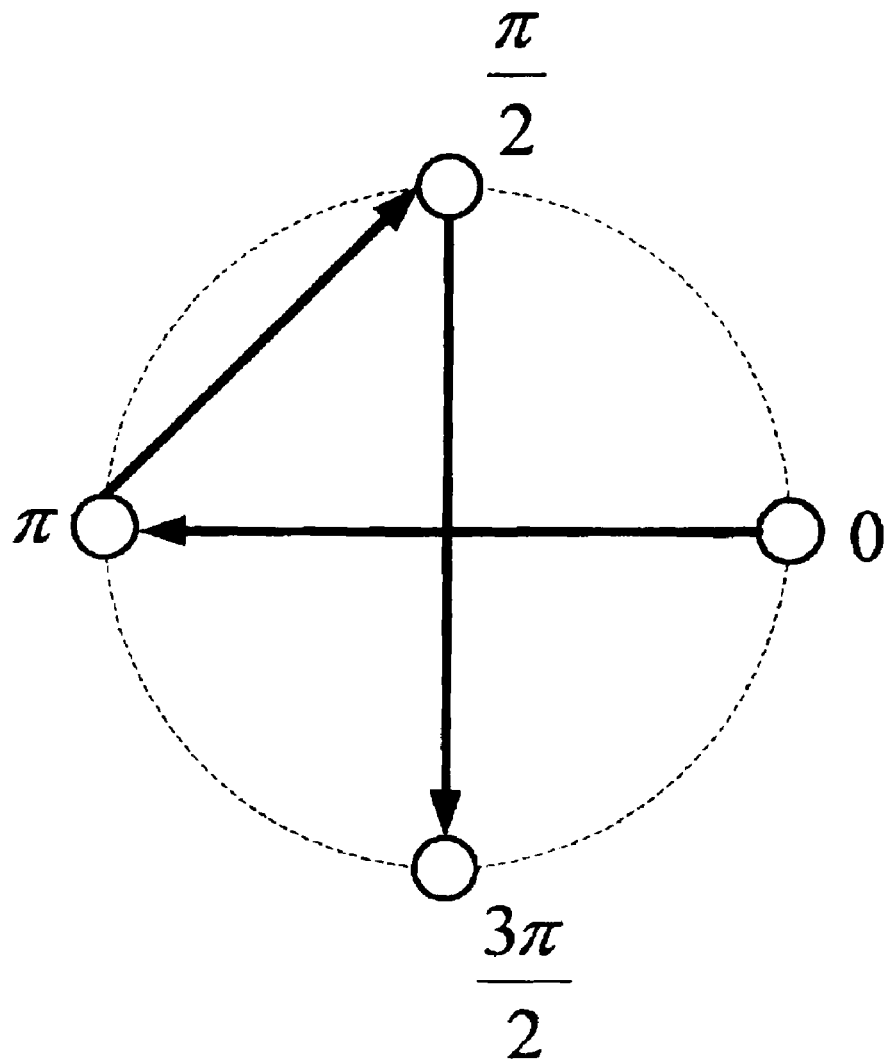
FIG. 4 is a schematic view showing a first example of transition of an initial phase that the transmitting station gives a transmission signal as an offset in the first embodiment.
FIG. 5 is a schematic view showing a concrete example of contents of an initial phase table used to implement the transition of the initial phase of the first example shown in FIG. 4.

FIG. 4 is a schematic view showing a first example of transition of an initial phase that the transmitting station gives a transmission signal as an offset in the first embodiment. FIG. 5 is a schematic view showing a concrete example of contents of an initial phase table used to implement the transition of the initial phase of the first example shown in FIG. 4. FIG. 4 and FIG. 5 show an example of the case where the resending operation is executed up to three times (the case where the maximum number of transmission times is set to four).

In the present embodiment, in case the initial phase should be changed every number of resending times, a value close to the maximum phase difference $\pi$ is set as the initial phase herein such that a phase difference from the preceding resending should be produced as large as possible, e.g., a phase difference from the initial phase in the preceding resending operation could have as large a value as possible in predetermined conditions.

The initial phase controller 17 has an initial phase table shown in FIG. 5. The initial phase table shown in FIG. 5 prepares four values between 0 to $2\pi$ as the initial phase, and holds initial phase values that are correlated with the numbers 1 to 4 of transmission times about the same data respectively.

That is, when the initial phase is controlled in accordance with the initial phase table shown in FIG. 5, this initial phase is changed sequentially in order of 0, π, π/2, 3π/2, as shown in FIG. 4, in response to the number of transmission times (the number of resent times+1).

Figures 6, 7:
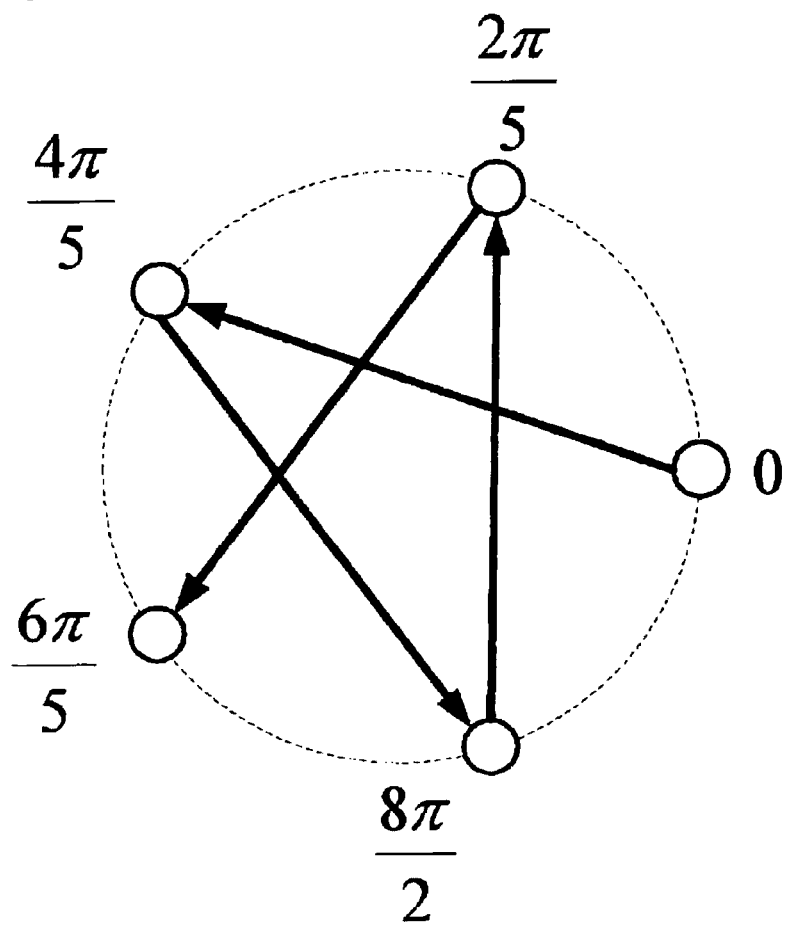
FIG. 6 is a schematic view showing a second example of transition of an initial phase that the transmitting station gives the transmission signal as an offset in the first embodiment.
FIG. 7 is a schematic view showing a concrete example of contents of an initial phase table used to implement the transition of the initial phase of the first example shown in FIG. 6.

FIG. 6 is a schematic view showing a second example of transition of an initial phase that the transmitting station gives the transmission signal as an offset in the first embodiment. FIG. 7 is a schematic view showing a concrete example of contents of an initial phase table used to implement the transition of the initial phase of the first example shown in FIG. 6. FIG. 6 and FIG. 7 show an example of the case where the resending operation is executed up to four times (the case where the maximum number of transmission times is set to five).

The initial phase table shown in FIG. 7 prepares five values between 0 to 2π as the initial phase, and holds initial phase values that are correlated with the numbers 1 to 5 of transmission times about the same data respectively. That is, when the initial phase is controlled in accordance with the initial phase table shown in FIG. 7, this initial phase is changed sequentially in order of 0, 4π/5, 8π/5, 2π/5, 6π/5, as shown in FIG. 6, in response to the number of transmission times (the number of resent times+1).

Meanwhile, the receiving station shown in FIG. 2 is equipped with a plurality of antennas 31a, 31b, a plurality of Fourier transformers (FFTs) 32a, 32b, a plurality of parallel/serial converters (P/Ss) 33a, 33b, a control signal demodulator 34, a demodulator 35, a channel estimator 36, an initial phase information saving section 37, a deinterleaving section 38, a rate dematching section 39, a likelihood saving section 40, a likelihood synthesizing section 41, a decoding section 42, a CRC checker 43, and a response signal (ACK/NACK) outputting section 44.

A radio wave transmitted from the destination station (e.g., the transmitting station shown in FIG. 1) is received by a plurality of independent antennas 31a, 31b respectively.

A high-frequency signal of the radio wave received by the antenna 31a is converted into a signal such as a baseband signal, or the like in a relatively low frequency band by a high-frequency signal processing circuit (not shown), and then input into the Fourier transformer (FFT) 32a. Similarly, a high-frequency signal of the radio wave received by the antenna 31b is converted into a signal such as a baseband signal, or the like in a relatively low frequency band by a high-frequency signal processing circuit (not shown), and then input into the Fourier transformer (FFT) 32b.

The Fourier transformers 32a, 32b apply the Fourier transform to the receiving signals being input as the OFDM signal respectively, and thus transform the signals from a time domain to a frequency domain. That is, respective frequency components of a large number of subcarriers superposed on the OFDM signals are separated and extracted every frequency. Then, the Fourier transformers 32a, 32b output the parallel data being independent every subcarrier as the receiving signals.

The parallel/serial converter 33a converts the parallel data being output from the Fourier transformer 32a into the serial data, and outputs the serial data as the received data. Similarly, the parallel/serial converter 33b converts the parallel data being output from the Fourier transformer 32b into the serial data, and outputs the serial data as the received data.

The control signal demodulator 34 demodulates a control signal for the concerned data from the received signals being output from the parallel/serial converters 33a, 33b respectively. Then, the control signal demodulator 34 outputs a value of the number of transmission times contained in the control signal. This value of the number of transmission times is input into the initial phase information saving section 37.

The initial phase information saving section 37 saves the value of the number of transmission times being input from the control signal demodulator 34, and outputs a value of the initial phase in response to this value of the number of transmission times. Here, in order to grasp the correspondence between the number of transmission times and the initial phase, the initial phase information saving section 37 has the table shown in FIG. 5 and FIG. 7, like the transmitting station. A value of the initial phase that the initial phase information saving section 37 outputs is input into the channel estimator 36.

The channel estimator 36 executes the channel estimation based on pilot signals contained in the signals transmitted from respective transmitting antennas of the destination station (transmitting station), and then calculates a channel estimation value based on the value of the initial phase received from the initial phase information saving section 37. The calculated channel estimation value is input into the demodulator 35.

The demodulator 35 executes a demodulating process of the received signal corresponding to own station, by using the channel estimation value received from the channel estimator 36. The received signal output from the demodulator 35 undergoes the deinterleaving process in the deinterleaving section 38. Then, in accordance with the control signal being output from the control signal demodulator 34, multiple levels in modulation and a coding rate are controlled in the rate dematching section 39 so as to coincide with those on the transmitting side.

The likelihood saving section 40 saves information representing a likelihood in the received signal being output from the rate dematching section 39. The likelihood synthesizing section 41 synthesizes likelihood information concerning the received signal saved in the past in the likelihood saving section 40 and likelihood information concerning the received signal being received at present, and then outputs the synthesized result.

The decoding section 42 applies a decoding process to the received signal being input from the likelihood synthesizing section 41 to reconstitute the transmitted data. The CRC checker 43 applies the CRC (Cyclic Redundancy Check) to the data output from the decoding section 42 to check whether or not a data error is contained. Then, the checked data is output from the CRC checker 43 as received data. In accordance with the CRC check, the response signal outputting section 44 outputs ACK as the response signal when the decoded result is OK and the reception was successful, and outputs NACK as the response signal when the decoded result is NG and the reception ended in failure. The response signal outputting section 44 transmits either of these response signals from a transmitting section (not shown) and informs the destination station (e.g., the transmitting station shown in FIG. 1) of it. The response signal outputting section 44 fulfills a function of a response informing section.

Next, controlling procedures in the present embodiment containing a concrete example when communication is held between the transmitting station shown in FIG. 1 and the receiving station shown in FIG. 2 will be explained with reference to FIG. 8 hereinafter.

Figure 8:
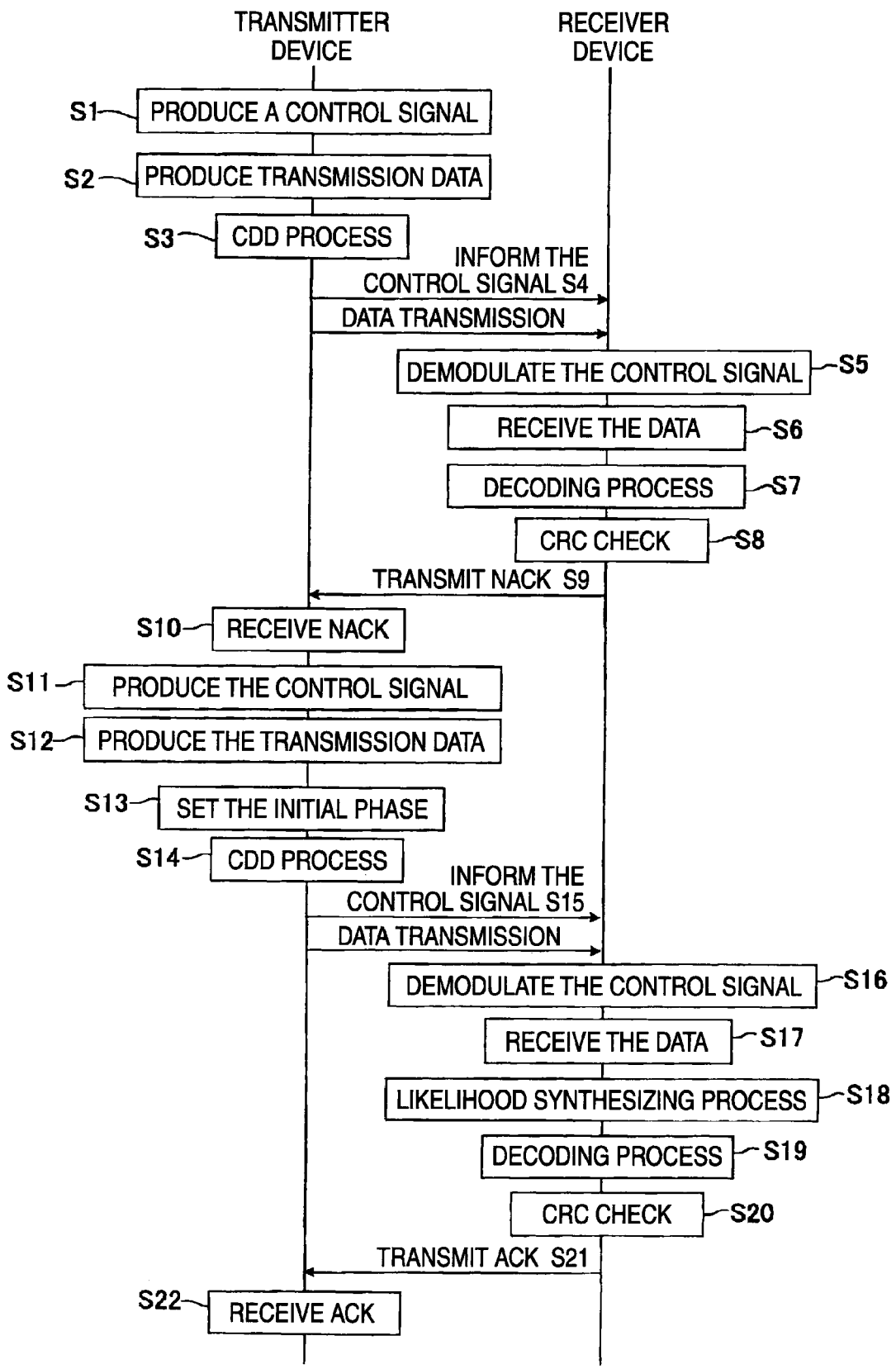
FIG. 8 is a sequence diagram showing a concrete example of controlling procedures about a communication between the transmitting station and the receiving station in the first embodiment.

FIG. 8 is a sequence diagram showing a concrete example of controlling procedures of the communication between the transmitting station and the receiving station in the first embodiment.

In the transmitting station (transmitting apparatus), in step S1, the response signal demodulator 16 produces the control signal. In step S2, the coding section 11, the rate matching section 12, the interleaving section 13, the modulator 14, and the serial/parallel converter 15 produce transmission data containing data to be transmitted, error correcting code, etc. Also, in step S3, the initial phase controller 17 and the phase shift amount assigning section 18 apply the foregoing CDD process to the transmission data. Then, in step S4, the transmitting station transmits the control signal and the transmission data as the radio signals from the antennas 20a, 20b via the inverse Fourier transformers 19a, 19b respectively. Here, the number of transmission times (the number of resent times+1) about the same signal is contained in the control signal.

In this event, the phase offset is not given by the CDD in the first-time transmission. Therefore, as shown in FIG. 3A, the phase shift that changes cyclically from 0 to $2\pi$ [rad] in frequency ranges of f1 to f2, f2 to f3, and f3 to f4 on the frequency axis respectively is caused in the OFDM signals of the transmission data.

In the receiving station (receiver device), in step S5, the signals from the transmitting station are received via the antennas 31a, 31b, the Fourier transformers 32a, 32b, and the parallel/serial converter 33a, 33b, and then the control signal demodulator 34 demodulates the control signal. Also, in step S6, the data are received similarly. In step S7, the decoding process is applied by the demodulator 35, the channel estimator 36, the initial phase information saving section 37, the deinterleaving section 38, the rate dematching section 39, the likelihood saving section 40, the likelihood synthesizing section 41, and the decoding section 42. In step S8, the CRC checker 43 executes the CRC check. In accordance with this CRC check, the response signal outputting section 44 outputs ACK as the response signal when the decoded result is OK, and outputs NACK as the response signal when the decoded result is NG. Then, these response signals are transmitted from a transmitting section (not shown), and the transmitting station is informed of these signals.

Here, the case where the receiving station failed to receive the data in the first transmission and the data error is detected in step S8 is assumed. Therefore, in next step S9, the receiving station transmits NACK (Not Acknowledgement) as the response to the transmitting station by the radio signal.

In step S10, the transmitting station receives NACK from the receiving station. Then, in step S11, the response signal demodulator 16 produces the control signal corresponding to the resending operation. If the preceding transmission is the first time, the next transmission is the second time (resending operation). Thus, the response signal demodulator 16 produces the control signal indicating that the number of transmission times corresponds to the second time. In step S12, like the above, the transmission data containing data to be transmitted, error correcting code, etc. are produced with respect to the same data as those in the preceding transmission.

In next step S13, in the transmitting station, the initial phase controller 17 decides the initial phase according to the number of transmission times. For example, when the initial phase controller 17 uses the initial phase table shown in FIG. 5, the initial phase of $\pi$ [rad] is given as the phase offset in the CDD because the subsequent transmission is the second-time transmission.

In step S14, in the transmitting station, the initial phase controller 17 and the phase shift amount assigning section 18 apply the above-mentioned CDD process to the transmission data. At this time, since the initial phase is changed in step S13, the offset is caused in the phase shift of the transmission data that are to be transmitted subsequently.

More particularly, as shown in FIG. 3B, the initial phase in the position of the frequency f1 as a starting point in the frequency axis is set to an angle $\pi$ [rad]. Therefore, phase shifts obtained by adding the phase offset OST of $\pi$ [rad] wholly to the phase shift that changes cyclically from 0 to $2\pi$ [rad] in the frequency ranges of f1 to f2, f2 to f3, and f3 to f4 respectively in response to the number of transmission times are produced. Then, in step S15, like the above, the transmitting station transmits the control signal and the transmission data from the antennas 20a, 20b respectively.

In step S16, the transmitting station receives the control signal from the receiving station, and the control signal demodulator 34 demodulates the control signal. In step S17, the data are received similarly and the demodulator 35 demodulates the received signal. In step S18, the likelihood synthesizing section 41 executes a likelihood synthesizing process. In step S19, the decoding section 42 executes a decoding process of the data. Then, in step S20, the CRC checker 43 applies the CRC check to the decoded data. In accordance with the CRC check, the response signal outputting section 44 outputs ACK as the response signal when the decoded result is OK, and outputs NACK as the response signal when the decoded result is NG. Then, the receiving station transmits the response signal from a transmitting section (not shown), and informs the transmitting station of the response signal.

Here, the case where the receiving station can receive correctly the second-time transmission data being resent from the transmitting station in step S15 is assumed. Therefore, in next step S21, the receiving station transmits ACK (Acknowledgement) representing that the receiving station succeeded in the reception, as the response to the transmitting station.

In step S22, the response signal demodulator 16 receives ACK as the response from the receiving station. Thus, the transmitting station recognizes that the transmission of the transmitted data is completed. Therefore, the transmitting station transmits other data to be transmitted next in the subsequent transmitting process as the transmission data.

As described above, in the first embodiment, in the transmitting station, the initial phase controller 17 adds the different offset to the phase shift being given to the signal transmitted by CDD in response to the number of transmission times. Accordingly, the propagation characteristics of the radio propagation path between the transmitting station and the receiving station changes in response to the number of transmission times (number of resending times). For example, as shown in FIG. 3B, a displacement in the frequency characteristic of the radio propagation path is caused by the offset OST of the phase shift between the frequency characteristic of the signal transmitted for the first time and the frequency characteristic of the signal transmitted for the second time by the resending operation on the frequency axis direction. As a result, the position of the notch on the frequency characteristic of the radio propagation path can be displaced relatively at the first-time transmission and the resending operation, and the respectively independent characteristics whose correlation of the frequency characteristic is small can be attained every number of transmission times.

Also, the receiving station recognizes the offset of the phase shift in response to the number of transmission times at the transmitting station, and the channel estimator 36 calculates the channel estimation value. Therefore, the demodulator 35 can demodulate correctly the received signal directed to own station. At this time, when the received signal that is resent is to be decoded, the resending synthesis may be executed, and then the decoding may be executed by using the result derived when the likelihood synthesizing section 41 synthesizes a likelihood of the received signal in the past (the output of the likelihood saving section 40) and a likelihood of the received signal at present. As a result, a chance that the receiving station succeeds in a reception of the resending signal can be enhanced.

That is, at a time of the resending operation, as shown in FIG. 3B, signals on mutually independent propagation paths obtained by synthesizing the frequency characteristics on the propagation path used in the first-time transmission and the frequency characteristics on the propagation path used in the second-time transmission can be added by the resending synthesis. Therefore, a frequency diversity effect due to CDD can be sufficiently achieved, and SNR can be improved.

Accordingly, when the resending control is applied while executing a transmission diversity due to CDD, an increase of the synthesized gain produced by the resending operation can be achieved. In this case, the influence of a falloff of a receiving amplitude at the particular frequency corresponding to the notch can also be lessened. As a result, when the resending control is applied at a time of execution of a transmission diversity using CDD, a larger diversity gain can be obtained rather than the case where an amount of offset that is variable every number of resending times is not added to the phase shift.

Second Embodiment

Figure 9:
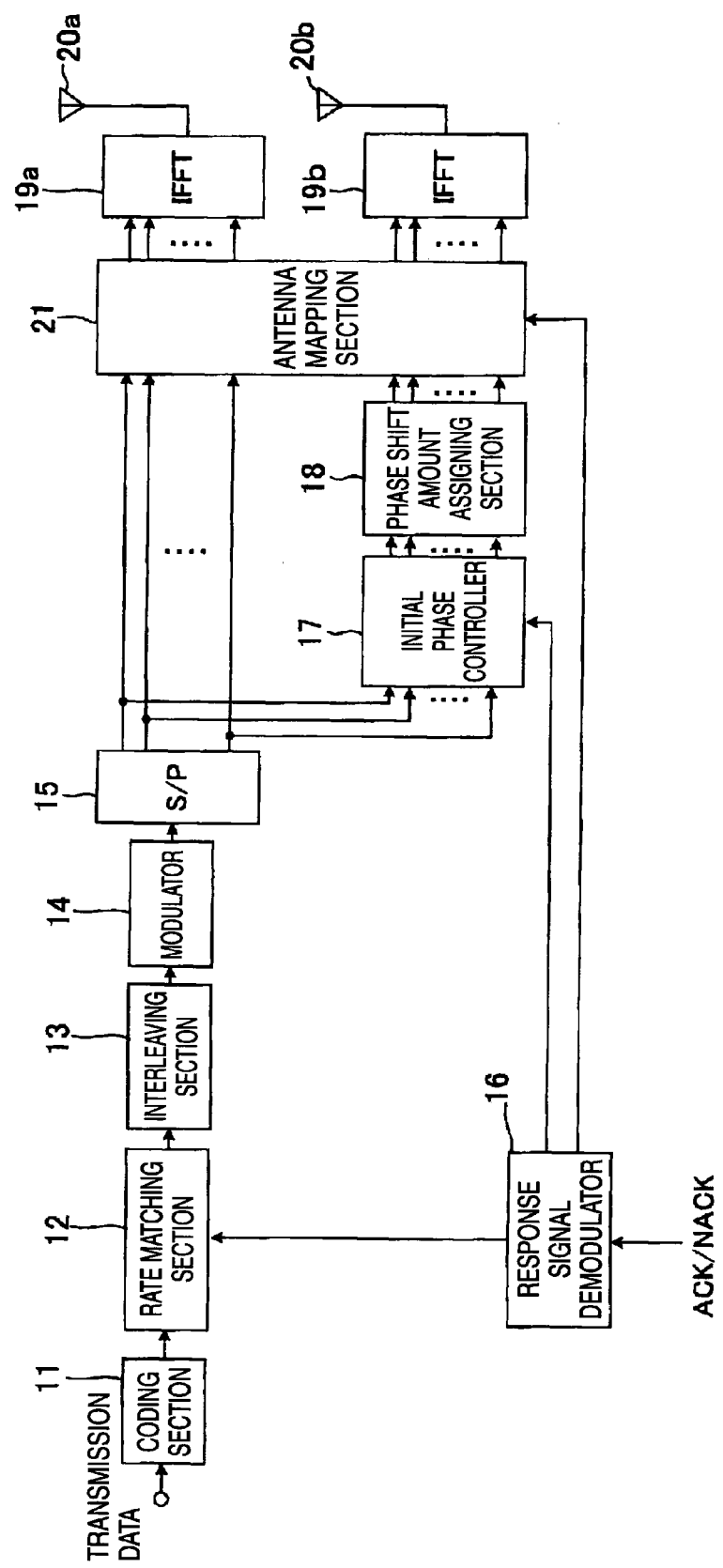
FIG. 9 is a block diagram showing a configuration of principal sections of a transmitting station employed in a second embodiment of the present invention.
Figure 10:
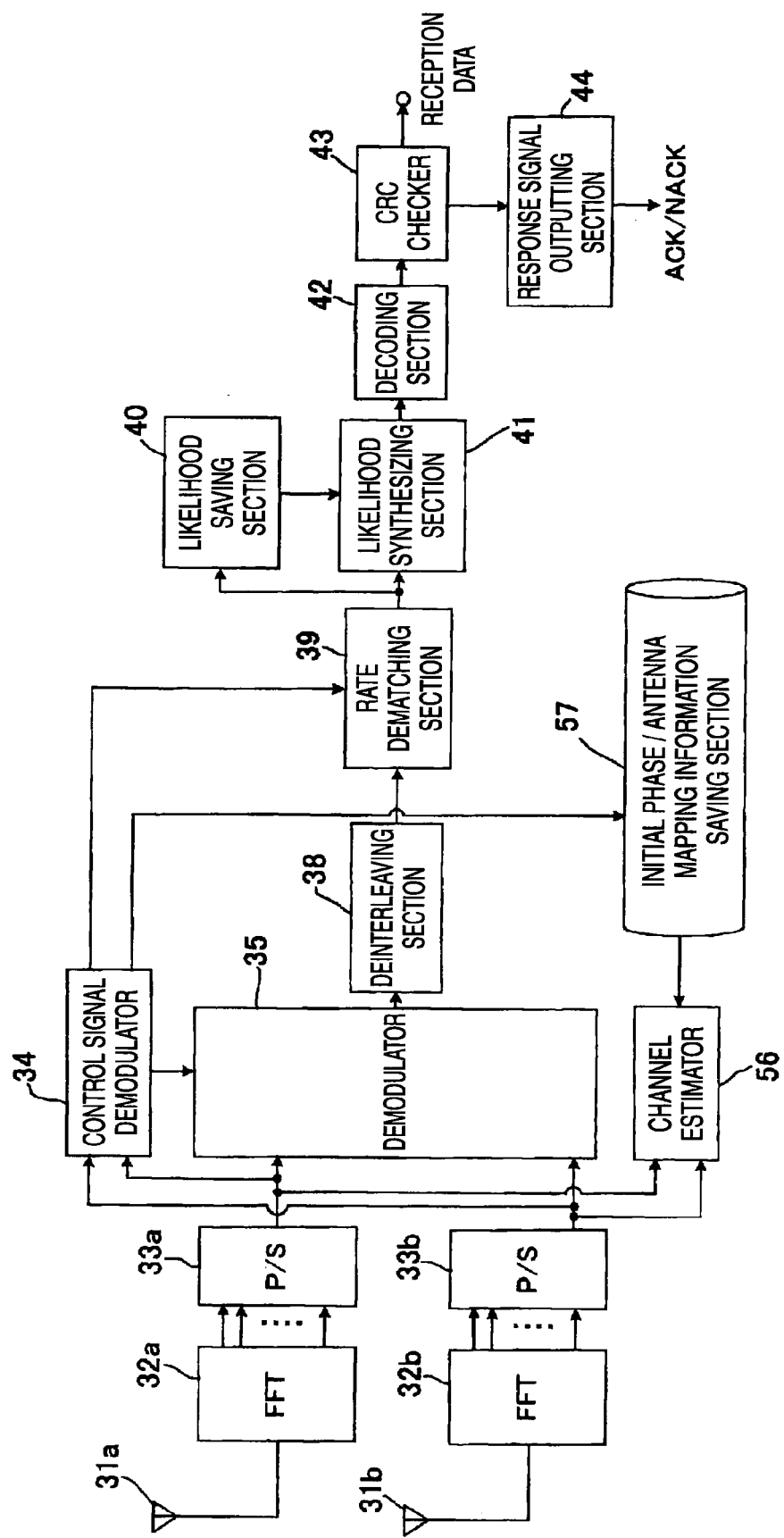
FIG. 10 is a block diagram showing a configuration of principal sections of a receiving station employed in the second embodiment of the present invention.

FIG. 9 is a block diagram showing a configuration of principal sections of a transmitting station employed in a second embodiment of the present invention. FIG. 10 is a block diagram showing a configuration of principal sections of a receiving station employed in the second embodiment of the present invention.

The second embodiment is an example in which a part of the first embodiment is varied. Here, in the second embodiment, the same reference symbols are affixed to the similar elements to those in the first embodiment, and their detailed explanation will be omitted herein.

The transmitting station shown in FIG. 9 is equipped with an antenna mapping section 21 as a new constituent element in contrast to the configuration in FIG. 1. The antenna mapping section 21 fulfills a function of a antenna mapping controller. The antenna mapping section 21 is provided between an output of the serial/parallel converter 15 and an input of the inverse Fourier transformer 19a and between an output of the phase shift amount assigning section 18 and an input of the inverse Fourier transformer 19b. Also, information about the number of transmission times output from the response signal demodulator 16, i.e., (number of resent times+1), is input into a control input of the antenna mapping section 21. Also, configurations and operations of remaining constituent elements are similar to those of the transmitting station shown in FIG. 1 in the first embodiment.

The antenna mapping section 21 sets a combination of the signals, which are input into the inverse Fourier transformers 19a, 19b respectively and in which the cyclic phase shift is produced due to CDD, and the transmission antennas (antenna mapping) in response to the number of transmission times. Here, the antenna mapping section 21 switches two transmission signals alternately with respect to two antennas.

FIG. 11 is a schematic view showing concrete examples of contents of an antenna mapping table used in the transmitting station in the second embodiment. The antenna mapping section 21 has an antenna mapping table shown in FIG. 11, and holds information of initial phases correlated with each number of transmission times and antenna assignment. Here, because two antennas are provided, the antenna mapping section 21 switches alternately the output of the signal transmitted to the antenna in response to whether the number of transmission times is odd or even.

That is, when the number of transmission times is odd, the antenna mapping section 21 provides a signal A being output from the serial/parallel converter 15 to the input of the inverse Fourier transformer 19a (the first antenna 20a), and also provides a signal B being output from the phase shift amount assigning section 18 to the input of the inverse Fourier transformer 19b (the second antenna 20b). Also, when the number of transmission times is even, the antenna mapping section 21 provides the signal A being output from the serial/parallel converter 15 to the input of the inverse Fourier transformer 19b (the second antenna 20b), and also provides the signal B being output from the phase shift amount assigning section 18 to the input of the inverse Fourier transformer 19a (the first antenna 20a).

Therefore, when the number of transmission times is odd, the signal to which the phase shift is not added due to CDD is transmitted from the first antenna 20a, and the signal to which the phase shift is added is transmitted from the second antenna 20b. Also, when the number of transmission times is even, conversely the signal to which the phase shift is not added due to CDD is transmitted from the second antenna 20b, and the signal to which the phase shift is added is transmitted from the first antenna 20a.

Also, like the above first embodiment, the offset responding to the number of transmission times is added to the phase shift, which is given to the signal being transmitted from the antenna 20a or the antenna 20b, under control of the initial phase controller 17.

Meanwhile, in the receiving station shown in FIG. 10, an initial phase/antenna mapping information saving section 57 is provided instead of the initial phase information saving section 37 shown in FIG. 2 in the first embodiment, and an operation of a channel estimator 56 is slightly different from that of the channel estimator 36 in the first embodiment. Also, configurations and operations of remaining constituent elements are similar to those of the receiving station shown in FIG. 2 in the first embodiment.

The initial phase/antenna mapping information saving section 57 saves the value of the number of transmission times being input from the control signal demodulator 34, and outputs the value of the initial phase and the antenna mapping information in response to the value of the number of transmission times. The antenna mapping information represent the correspondence between states of the phase shift and two transmission antennas (20a, 20b), and is specified in response to the number of transmission times. Here, in order to grasp a correspondence between the antenna mapping information and the initial phase information and the number of transmission times, the initial phase/antenna mapping information saving section 57 contains a table for performing the information in advance, like the transmitting station.

The value of the initial phase and the antenna mapping information being output from the initial phase/antenna mapping information saving section 57 are input into the channel estimator 56. The channel estimator 56 executes the channel estimation based on the pilot signals contained in the signals being transmitted from respective antennas of the destination station (transmitting station), and calculates the channel estimation value based on the value of the initial phase and the antenna mapping information being received from the initial phase/antenna mapping information saving section 57. Then, the calculated channel estimation value is input into the demodulator 35.

Next, an operation of the transmitting station made under control of the antenna mapping section 21 will be explained with reference to FIG. 12 hereunder.

Figure 12B:
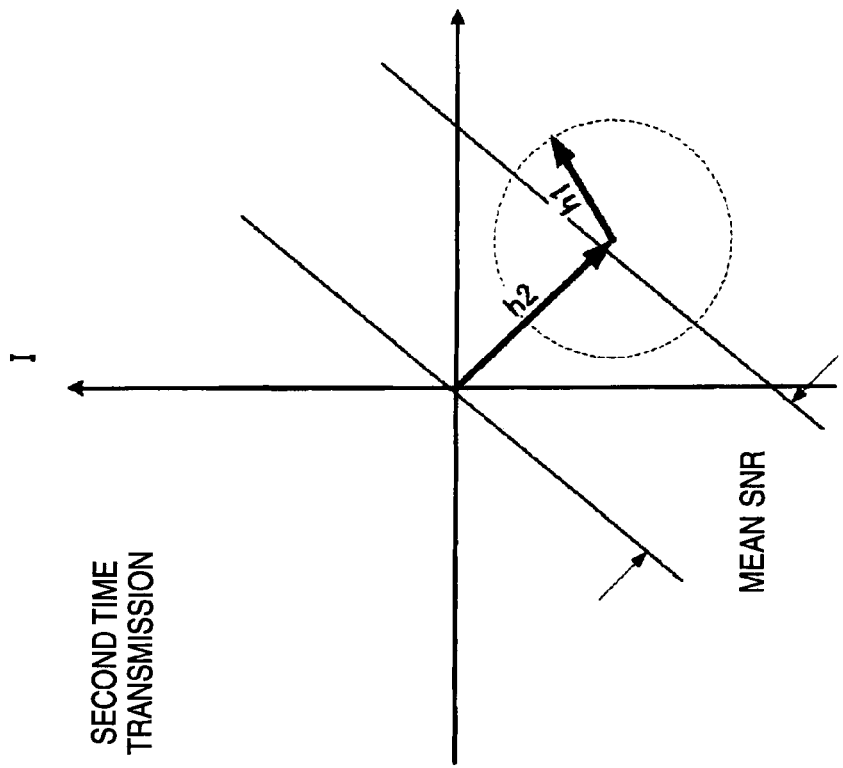
FIGS. 12A and 12B are vector diagrams showing concrete examples of a synthesized vector of signals that the transmitting station transmits from two antennas in the second embodiment.
Figure 12A:
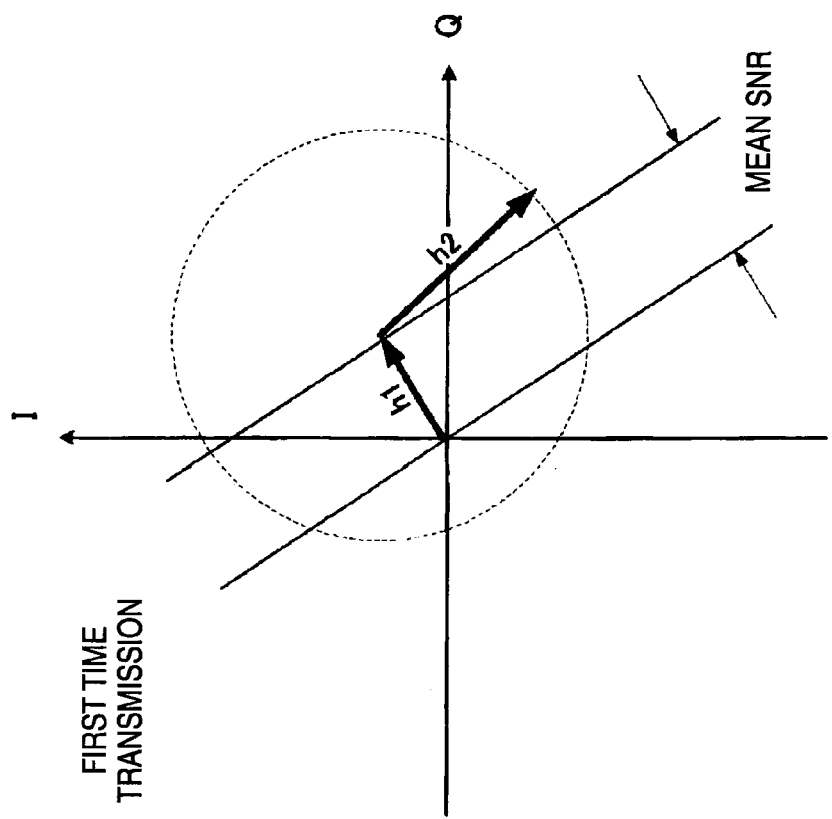

FIGS. 12A and 12B are vector diagrams showing concrete examples of a synthesized vector of the signals that the transmitting station transmits from two antennas in the second embodiment. FIG. 12A shows the first-time transmission, and FIG. 12B shows the second-time transmission conducted by the resending operation. Like the first embodiment, when the number k of the subcarrier is increased by 1, the signal being sent out from one antenna under control of the phase shift amount assigning section 18 is turned by $2\pi D/N$ in phase on a complex plane, as indicated by above Formula 2.

In FIGS. 12A and 12B, on the IQ plane, a variation of the propagation path of one transmitting antenna 20a is expressed by a vector h1, a variation of the propagation path of the other transmitting antenna 20b is expressed by a vector h2, and the signals that are sent out from two antennas are expressed as a synthesized vector. In the case of the first-time transmission shown in FIG. 12A, the phase shift is not applied to the transmission signal from the transmitting antenna 20a, and the cyclic phase shift due to CDD is applied to the transmission signal from the transmitting antenna 20b. Accordingly, the vector h1 becomes a vector that has predetermined magnitude and direction, and the vector h2 becomes a vector that has a predetermined magnitude and is turned by the phase shift. A variation of the propagation path caused when the signals that arrive at the receiving station from two transmitting antennas are synthesized and observed on the propagation paths is equivalent to the vector h2, which is turned around an end point of h1 by $2\pi$, within the frequency width in which the vector h1 can be regarded as constant. That is, a quality of the propagation path obtained on average in this frequency interval is decided the amplitude of the vector h1, as indicated by a "mean SNR" in FIG. 12, for the vector h2 is turned by one rotation and its average becomes 0.

Also, in the case of the second-time transmission shown in FIG. 12B, the cyclic phase shift due to CDD is applied to the transmission signal from the transmitting antenna 20a, and the phase shift is not applied to the transmission signal from the transmitting antenna 20b. Accordingly, the vector h1 becomes a vector that has a predetermined magnitude and is turned by the phase shift, and the vector h2 becomes a vector that has predetermined magnitude and direction. A variation of the propagation path caused when the signals that arrive at the receiving station from two transmitting antennas are synthesized is equivalent to the vector h1, which is turned around an end point of h2 by $2\pi$, within the frequency width in which the vector h2 can be regarded as constant. A quality of the propagation path obtained on average in this frequency interval is decided the amplitude of the vector h2.

In other words, a quality of the propagation path obtained on average is changed depending on to which one of the transmitting antenna 20a and the transmitting antenna 20b an amount of phase turn calculated by Formula 2 should be assigned. In an example in FIG. 12, under control of the antenna mapping section 21, a state shown in FIG. 12A and a state shown in FIG. 12B are switched alternately by the number of resending times, depending on whether the number of transmission times is odd or even.

In this manner, according to the second embodiment, a quality (mean SNR) of the radio propagation path obtained on average can be set to a different value respectively in response to the number of transmission times such as the first-time transmission, the second-time transmission, and the like. In particular, when there is a difference between the amplitudes of h1 and h2 (magnitudes of the vectors), the value of the mean SNR can be changed largely every number of resending times. Therefore, when the resending control is applied while executing the transmission diversity due to CDD, the SNR that becomes different every number of resending times can be implemented by changing the antenna mapping to the transmission signals (the assignment of the transmitting antennas) in response to the number of transmission times. As a result, a synthesized gain produced by the resending operation can be increased, and a larger diversity gain can be achieved.

Here, the antenna mapping in the present embodiment is created by focusing attention on the characteristic in the correlated bandwidth as the frequency band in which a variation of the propagation path can be regarded constant. Therefore, an operation of the antenna mapping section 21 may be set identically over the full frequency range used in the transmission, or may be set individually in respective blocks in a situation that some neighboring subcarriers are gathered into one block and the different mapping is assigned to each block respectively.

Third Embodiment

Figure 13:
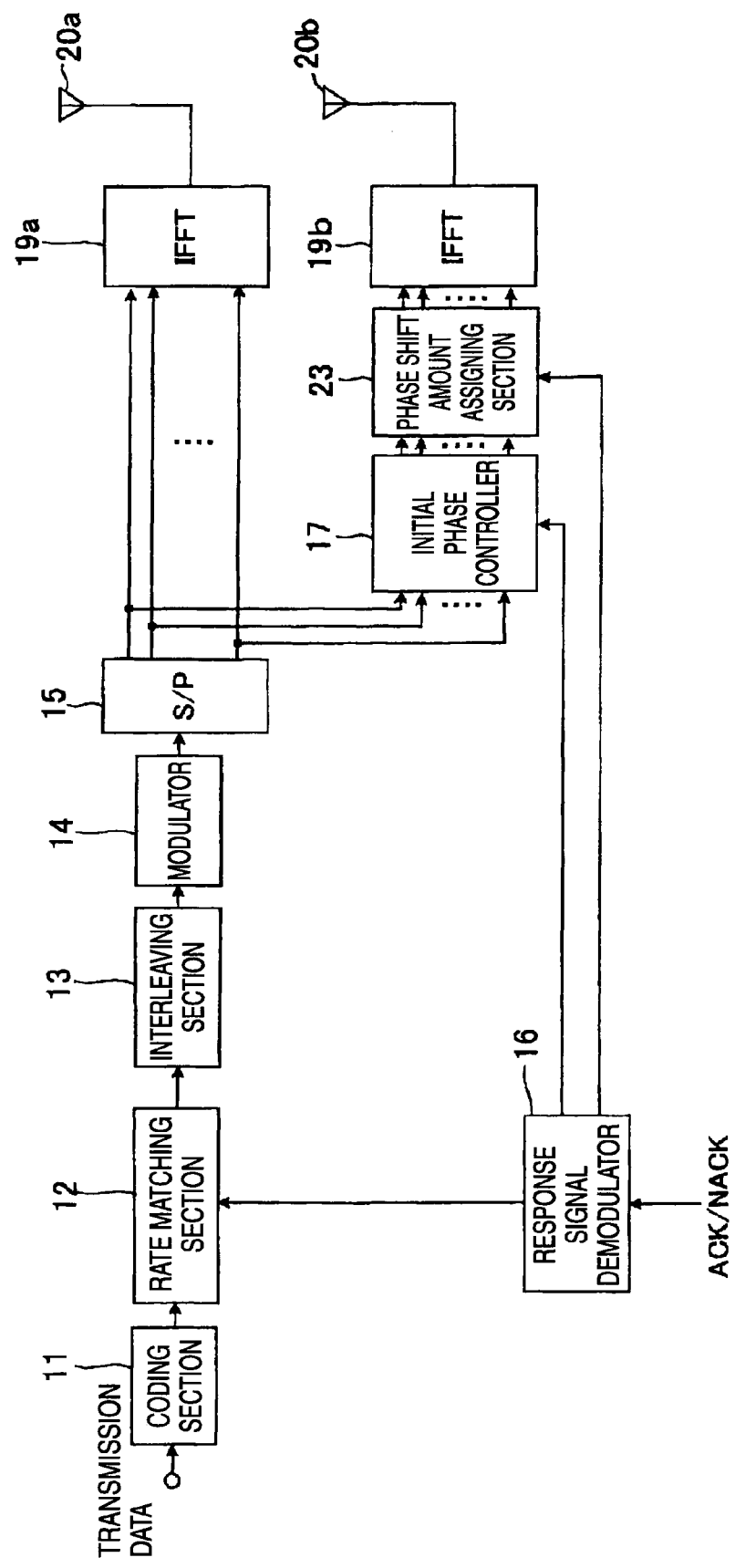
FIG. 13 is a block diagram showing a configuration of principal sections of a transmitting station employed in a third embodiment of the present invention.
Figure 14:
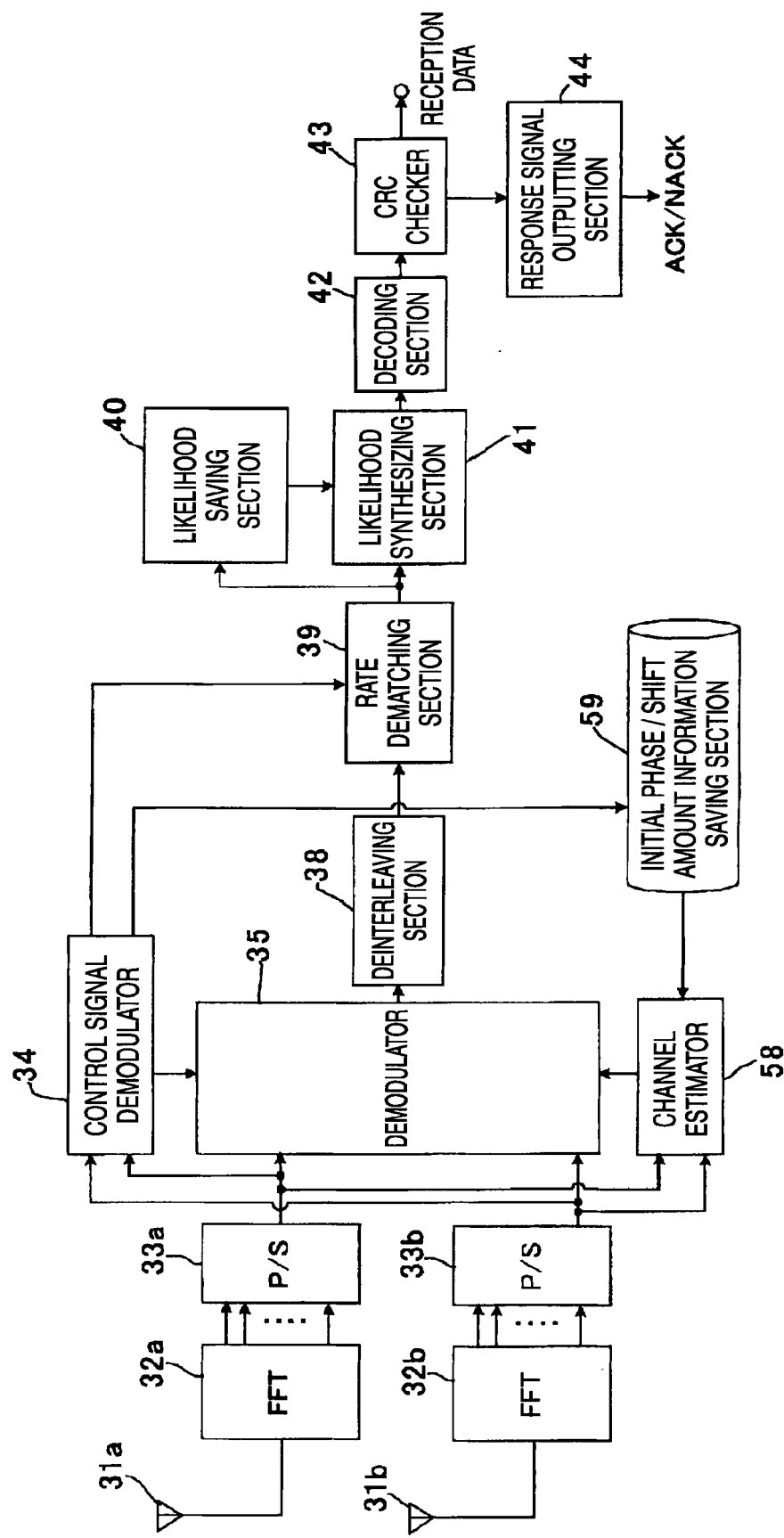
FIG. 14 is a block diagram showing a configuration of principal sections of a receiving station employed in the third embodiment of the present invention.

FIG. 13 is a block diagram showing a configuration of principal sections of a transmitting station employed in a third embodiment of the present invention. FIG. 14 is a block diagram showing a configuration of principal sections of a receiving station employed in the third embodiment of the present invention.

The third embodiment is an example in which a part of the first embodiment is varied. Here, in the third embodiment, the same reference symbols are affixed to the similar elements to those in the first embodiment, and their detailed explanation will be omitted herein.

In the transmitting station shown in FIG. 13, an operation of a phase shift amount assigning section 23 is different slightly from that in the configuration shown in FIG. 1. This phase shift amount assigning section 23 fulfills a function of the phase shift amount controller. Also, configurations and operations of remaining constituent elements are similar to those of the transmitting station shown in FIG. 1 in the first embodiment.

Also, in the receiving station shown in FIG. 14, an initial phase/shift amount information saving section 59 is provided instead of the initial phase information saving section 37 in the first embodiment, and an operation of a channel estimator 58 is different slightly from that in the first embodiment. Also, configurations and operations of remaining constituent elements are similar to those of the receiving station shown in FIG. 2 in the first embodiment.

FIGS. 15A and 15B are schematic diagrams showing concrete examples of contents of a phase shift amount table used in the transmitting station in the third embodiment. FIG. 15A shows a first example of the phase shift amount table, and FIG. 15B shows a second example of the phase shift amount table.

In the third embodiment, the phase shift amount assigning section 23 of the transmitting station shown in FIG. 13 has a phase shift amount table shown in FIG. 15A or FIG. 15B. This phase shift amount table holds plural pieces of phase shift amount D that are correlated with respective numbers of transmission times. The first example shown in FIG. 15A is an example in which a shift amount is set +10%, −10%, +20%, and −20% of an initial shift amount respectively as the number of transmission times is increased. The second example shown in FIG. 15B is an example in which + prime number 1, − prime number 1, + prime number 2, and − prime number 2 is set respectively (where a prime number 1 is close to 50% of an initial shift amount that is given by the n-th power of 2 and a prime number 2 is close to 25% of the initial shift amount) as the number of transmission times is increased.

The phase shift amount assigning section 23 acquires one value of shift amount from the phase shift amount table in response to the value of the number of transmission times being output from the response signal demodulator 16. Then, the phase shift amount assigning section 23 decides a phase rotating angle $\phi_k$, which is the phase shift given to the transmission signal, by above Formula 2 by using this phase shift amount and the initial phase decided in the initial phase controller 17.

That is, a phase shift amount D as a parameter used in deciding the phase rotating angle $\phi_k$ that is given to the transmission signal is set to the different value that is changed in response to the number of transmission times. Therefore, the frequency characteristics of the propagation path that are different every number of transmission times respectively can be obtained.

In this event, in changing a phase shift amount, not only a phase shift amount per a unit frequency such as each subcarrier, or the like may be switched every number of resending times, but also a difference of a phase shift amount between the mutually adjacent subcarriers on the frequency axis may be switched every number of resending times.

Figure 16B:
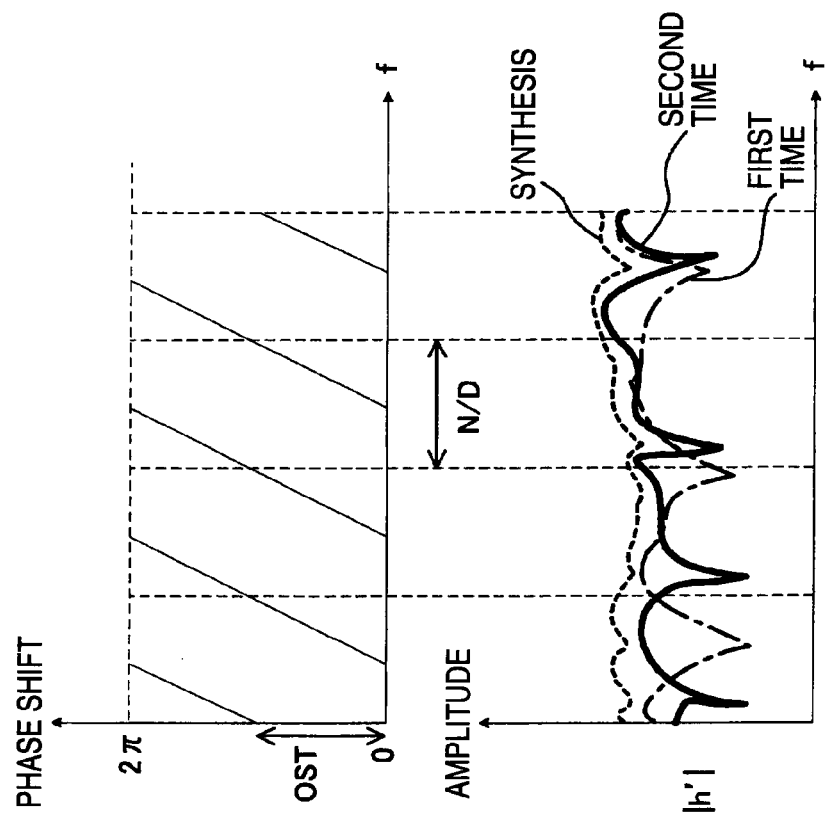
FIGS. 16A and 16B are graphs showing a concrete example of a frequency characteristic in a radio propagation path and a frequency characteristic of a phase shift between a transmitting station and a receiving station according to the third embodiment respectively.
Figure 16A:
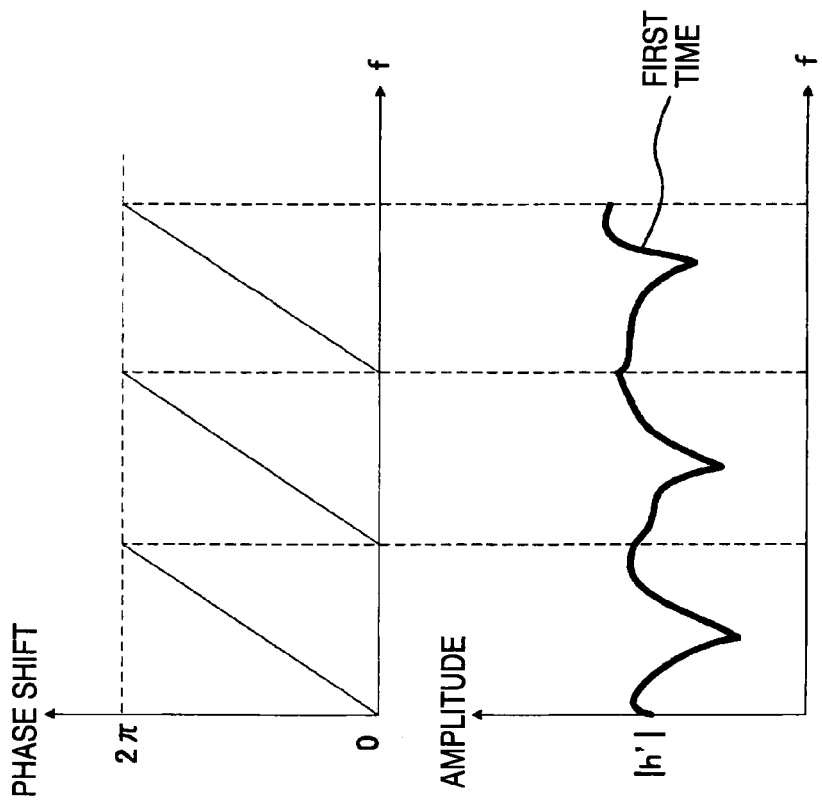
Figure 17A:
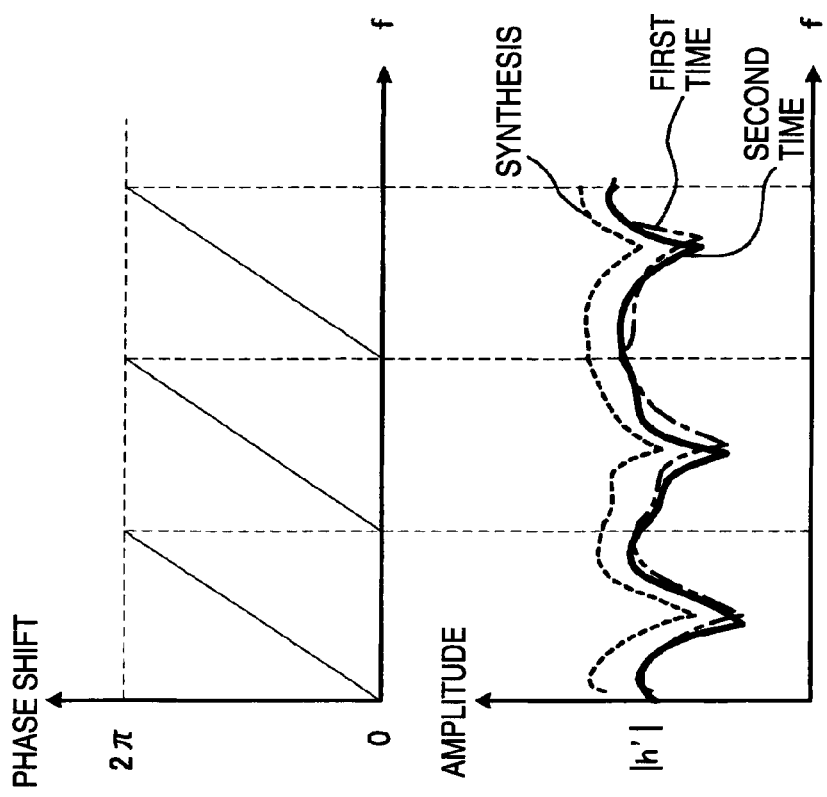
FIGS. 17A and 17B are graphs showing a concrete example of a frequency characteristic in a radio propagation path and a frequency characteristic of a phase shift respectively.
Figure 17B:
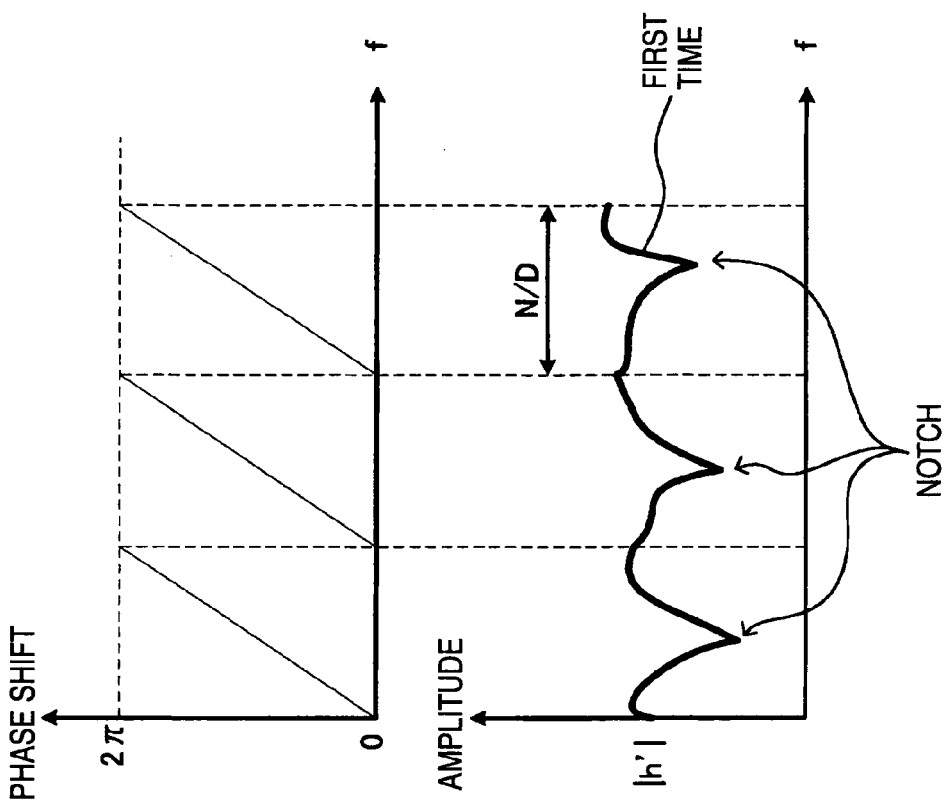

FIGS. 16A and 16B are graphs showing a concrete example of the frequency characteristic on the radio propagation path and the frequency characteristic of the phase shift between the transmitting station and the receiving station according to the third embodiment respectively. FIG. 16A shows an amplitude on the propagation path in the first-time transmission, and FIG. 16B shows an amplitude on the propagation path in the second-time transmission by the resending operation.

In the third embodiment, as shown in FIGS. 16A and 16B, the frequency interval (N/D) in which a phase shift amount is changed between 0 to $2\pi$ [rad] is changed in response to the number of transmission times. Therefore, not only the position of notch is displaced by the offset OST, but also the total number of notches produced in the same frequency band is changed. Accordingly, the signal can be transmitted while using the different radio propagation path whose independence is high every time when the resending operation is carried out. As a result, a synthesized gain produced by the resending operation can be improved.

Meanwhile, in the receiving station shown in FIG. 14, the initial phase/shift amount information saving section 59 saves the value of the number of transmission times being input from the control signal demodulator 34, and outputs the value of initial phase and the information of the phase shift amount D in response to the value of the number of transmission times. Here, in order to grasp the correspondence between the information of the phase shift amount D and the information of the initial phase and the number of transmission times the initial phase, the initial phase/shift amount information saving section 59 has the table that holds these information in advance, like the transmitting station.

The value of initial phase and the information of the phase shift amount D being output from the initial phase/shift amount information saving section 59 are input into the channel estimator 58. The channel estimator 58 executes the channel estimation based on pilot signals contained in the signals transmitted from respective transmitting antennas of the destination station (transmitting station), and then calculates the channel estimation value based on the value of the initial phase and the information of the phase shift amount D received from the initial phase/shift amount information saving section 59. The calculated channel estimation value is input into the demodulator 35.

In this manner, according to the third embodiment, the offset of the phase shift being added to the transmission signal due to CDD is changed in response to the number of transmission times, and also the phase shift amount is changed in response to the number of transmission times. Therefore, the frequency characteristics of the propagation paths that are different every number of transmission times respectively can be obtained. In this case, the independence of the frequency characteristics of the propagation path can be enhanced much more every number of resending times. Then, when the resending control is applied while executing a transmission diversity by the CDD, the position where the notch of the frequency characteristic of the radio propagation path is caused and the number can be set to different values every number of resending times, and thus the more independent propagation path can be synthesized for the purpose of resending operation. As a result, the synthesized gain produced by the resending operation can be improved, and the SNR can be improved.

In the above embodiments, the case where the communication is held by using the OFDM signal as the multi-carrier signal is assumed. But the transmission technology is not limited to the OFDM. Also, the present invention can be applied similarly to the communication system using the single-carrier signal (SC-FDMA) disclosed in following Literature (FIG. 9.1.1-1), or the like, for example. In this case, a delayed wave can be regarded as a variation in the frequency by inserting a cyclic prefix as well as the guard interval of OFDM, and thus the signal expression on the frequency axis can be implemented. As a result, the phase shift that is cyclic in the frequency axis direction can be given, as in the above embodiments.

3GPP TR 25.814 V7.1.0, "Physical layer aspects for evolved Universal Terrestrial Radio Access (UTRA)"

Also, in the above embodiments, the example in which the resending operation is executed when the destination station failed to receive the signal based on the response notified from the destination station (receiving station) is illustrated as the resending control. But the present invention is not limited to this example. For example, the present invention is similarly applicable to various cases using the resending control, e.g., the resending operation should be executed automatically when a predetermined time has elapsed and a time was over, the resending operation should be executed by a predetermined number of times that is set in advance, etc.

Also, in the above embodiments, the case where both the transmitting station and the receiving station are equipped with two antennas is assumed. But the present invention is similarly applicable to the case where the number of antennas is increased up to three, four, and the like, as occasion demands.

Also, the radio communication apparatus and the resending controlling method according to the present invention are applicable to the radio communication system used in the cellular system that provides the mobile communication service such as the cellular phone, etc., or the radio communication mobile station equipment, and the communication between these radio communication equipments, etc., for example. But the present invention is not limited to these applications. The present invention can be applied to various radio communications if such radio communication executes the CDD and the resending control in the radio communication system employing MIMO.

According to the present embodiments explained above, when the resending control is applied in executing the transmission diversity using the CDD, the position of the notch caused in the first-time transmission and the position of the notch caused in the second-time transmission can be shifted in the frequency characteristic of the radio propagation path by assigning the phase difference (offset) to the phase shift amount of the transmission signal in response to the number of resending times. As a result, the synthesized gain produced by the resending can be improved largely by the relatively simple control, and a sufficient diversity effect can be achieved by the resending control.

Here, the present invention is not limited to the matters shown in the above embodiments. The present invention is susceptible to variations and adaptations, which are made based on the description of the specification and well known technologies by those skilled in the art and are contained in a scope over which a protection is sought.

In the above embodiments, the case where the present invention is constructed by the hardware is explained by way of example. But the present invention can be implemented by the software.

Also, typically respective functional blocks used in the explanation of the embodiments are implemented as LSI as the integrated circuit. These blocks may be prepared as one chip individually, or may be prepared as one chip that contains a part or all of blocks. The LSI is used herein, but the LSI may also be called IC, system LSI, super LSI, or ultra LSI depending on a difference in integration degree.

Also, the approach of manufacturing the integrated circuit is not limited to LSI, but the dedicated circuit or the general-purpose processor may be employed. Also, the FPGA (Field Programmable Gate Array) that is programmable after the LSI is manufactured, or the reconfigurable processor in which connections and settings of the circuit cells in the LSI can be reconstructed may be utilized.

Further, when the technology to manufacture an integrated circuit instead of the LSI becomes practical with the progress of the semiconductor technology or other derivative technologies, of course the functional blocks may be integrated by applying such technology. An adaptation of the biotechnology may be considered as the feasibility.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2006-354569) filed on Dec. 28, 2006; the contents of which are incorporated herein by reference.

INDUSTRIAL APPLICABILITY

The present invention possesses such an advantage that the synthesized gain in the resending operation can be improved significantly by the relatively simple control when the resending control is applied at a time of execution of the transmission diversity using the CDD, and is useful to the radio communication apparatus and the resending controlling method, which are applicable to the radio communication system employing the MIMO.

The invention claimed is:

1. A radio communication apparatus for performing communication by MIMO (Multi Input Multi Output) using a plurality of antennas, the radio communication apparatus comprising:

a cyclic delay diversity processor which is adapted to give a phase for each of a plurality of subcarriers to a signal transmitted from at least one antenna and sets a phase for each of the plurality of subcarriers, such that the phase for each of the plurality of subcarriers is changed cyclically on a frequency domain;

a resending controller which is adapted to execute a retransmission of the signal; and an offset controller which sets a certain offset that is included in the phase of each of the plurality of subcarriers on retransmission of the signal, wherein the offset is set according to a number of retransmissions of the signal.

2. The radio communication apparatus according to claim 1, wherein the offset controller is adapted to set the offset to a value, from a plurality of values, and a difference between the value and a value set in a preceding transmission is substantially equal to a greatest difference between the plurality of values.

3. The radio communication apparatus according to claim 2, wherein the greatest difference between the value and the value set in the preceding transmission is $\pi$.

4. The radio communication apparatus according to claim 1, further comprising:

an antenna mapping controller which is adapted to set a correspondence between the plurality of antennas and the signals according to the number of retransmissions.

5. The radio communication apparatus according to claim 4, wherein the antenna mapping controller switches the antenna for the signal every number of retransmissions.

6. The radio communication apparatus according to claim 1, further comprising:

a phase shift amount controller which is adapted to set a difference between phases for adjacent subcarriers according to the number of retransmissions.

7. The radio communication apparatus of claim 1, wherein the offset of a second retransmission of the signal performed by the radio communication apparatus is different from another offset of a previous retransmission of the signal performed by the radio communication apparatus.

8. A radio communication apparatus for performing communication by MIMO (Multi Input Multi Output) using a plurality of antennas, the radio communication apparatus comprising:

a demodulator which is adapted to demodulate a received signal which was transmitted from at least one antenna and underwent a cyclic delay diversity process during transmission which sets a phase for each of a plurality of subcarriers, such that the phase for each of the plurality of subcarriers is changed cyclically on a frequency domain, wherein the phase of each of the plurality of subcarriers includes a certain offset for all of the subcarriers on retransmission of the signal and the offset is set according to a number of retransmissions of the signal;

wherein the demodulator is adapted to demodulate the received signal based on offset information, wherein the offset is set according to the number of retransmissions of the signal.

9. The radio communication apparatus according to claim 8, wherein the demodulator demodulates the signal based on a correspondence between the plurality of antenna and the signal set according to the number of retransmissions.

10. The radio communication apparatus according to claim 8, wherein the demodulator demodulates the signal based on information indicating a difference between phases for adjacent subcarriers, wherein the phases of the adjacent subcarriers are set according to the number of retransmissions.

11. A radio communication base station apparatus equipped with the radio communication apparatus as set forth in claim 1.

12. A radio communication mobile station apparatus equipped with the radio communication apparatus as set forth in claim 8.

13. The radio communication apparatus of claim 8, wherein the signal is retransmitted to the radio communication apparatus in plural retransmissions by the same transmitting device with different offsets for the different retransmissions of the signal.

14. A retransmitting controlling method employed in a radio communication apparatus that performs communication by MIMO (Multi Input Multi Output) using a plurality of antennas, the retransmitting controlling method comprising:
  applying a cyclic delay diversity process to a signal transmitted from at least one antenna and sets a phase of each of a plurality of subcarriers, such that the phase is changed cyclically on a frequency domain;
  executing a retransmitting operation in which the radio communication apparatus retransmits data previously sent in a previous sending operation; and
  setting a certain offset for each of the plurality of subcarriers that are retransmitted, wherein the offset is included in the phase of subcarriers and is set according to a number of retransmissions of the signal.

15. A radio communication system for performing communication by MIMO (Multi Input Multi Output) using a plurality of antennas, the radio communication system comprising:
  a transmitting device which includes:
    a cyclic delay diversity processor which applies a cyclic delay diversity process to a signal transmitted from at least one antenna and sets a phase for each of a plurality of subcarriers, such that the phase for each of the plurality of subcarriers is changed cyclically on a frequency domain;
    a resending controller which is adapted to execute a retransmission of the signal; and
    an offset controller which sets a certain offset that is included in the phase of each of the plurality of subcarriers on retransmission of the signal, wherein the offset is set according to a number of retransmissions of the signal; and
  the receiving device which includes:
    a demodulator which demodulates the signal based on offset information indicating the offset that is set according to the number of retransmissions of the signal.

16. The retransmitting controlling method of claim 14, wherein the offset of a second retransmission of the signal sent by the transmitting device is different from another offset of a previous retransmission of the signal performed by the transmitting device.

17. The radio communication apparatus of claim 7, wherein the second retransmission of the signal is sent after the previous retransmission of the signal.

* * * * *